US011803961B2

(12) United States Patent
Naftali et al.

(10) Patent No.: US 11,803,961 B2
(45) Date of Patent: Oct. 31, 2023

(54) DIE-TO-MULTI-DIE WAFER INSPECTION

(71) Applicant: Applied Materials Israel Ltd., Rehovot (IL)

(72) Inventors: Ron Naftali, Shoham (IL); Yariv Simovitch, Rehovot (IL); Guy Shwartz, Ramat-Gan (IL); Ido Almog, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 114 days.

(21) Appl. No.: 17/495,493

(22) Filed: Oct. 6, 2021

(65) Prior Publication Data
US 2023/0107630 A1   Apr. 6, 2023

(51) Int. Cl.
G06T 7/00 (2017.01)
G01N 21/95 (2006.01)
G01N 21/956 (2006.01)

(52) U.S. Cl.
CPC ......... G06T 7/001 (2013.01); G01N 21/9501 (2013.01); G01N 21/95607 (2013.01); G06T 2207/30148 (2013.01)

(58) Field of Classification Search
CPC .......... G06T 7/001; G06T 2207/30148; G01N 21/9501; G01N 21/95607
See application file for complete search history.

(56) References Cited

U.S. PATENT DOCUMENTS

| 7,924,420 B2* | 4/2011 | Shomrony | G01N 21/9501 356/237.5 |
| 2010/0076699 A1* | 3/2010 | Auerbach | G01N 21/9501 356/237.1 |
| 2020/0232934 A1* | 7/2020 | Feldman | G06T 7/001 |
| 2022/0012862 A1* | 1/2022 | Korngut | G06T 7/001 |
| 2022/0237758 A1* | 7/2022 | Shwartz | G06T 7/001 |

* cited by examiner

Primary Examiner — Roy M Punnoose
(74) Attorney, Agent, or Firm — KILPATRICK TOWNSEND & STOCKTON LLP

(57) ABSTRACT

Disclosed herein is s computer-based method for obtaining and analyzing multi-die scan data of a patterned wafer. The method includes sequentially implementing an operation of scanning a respective plurality of sets of slices on a wafer, and, per each slice segment in a multiplicity of slice segments in the plurality of sets of slices, an operation of performing die-to-multi-die (D2MD) analysis of scan data of the slice segment in order to detect defects in the slice segment. Each set of slices may constitute a subset of the totality of slices on the respective die-column. Sets scanned in a same implementation are analogous to one another, thereby facilitating—in the die-to-multi-die analysis of scan data of a slice segment—taking into account, as reference, scan data of areas on other die-columns, which were scanned in the same implementation.

20 Claims, 10 Drawing Sheets

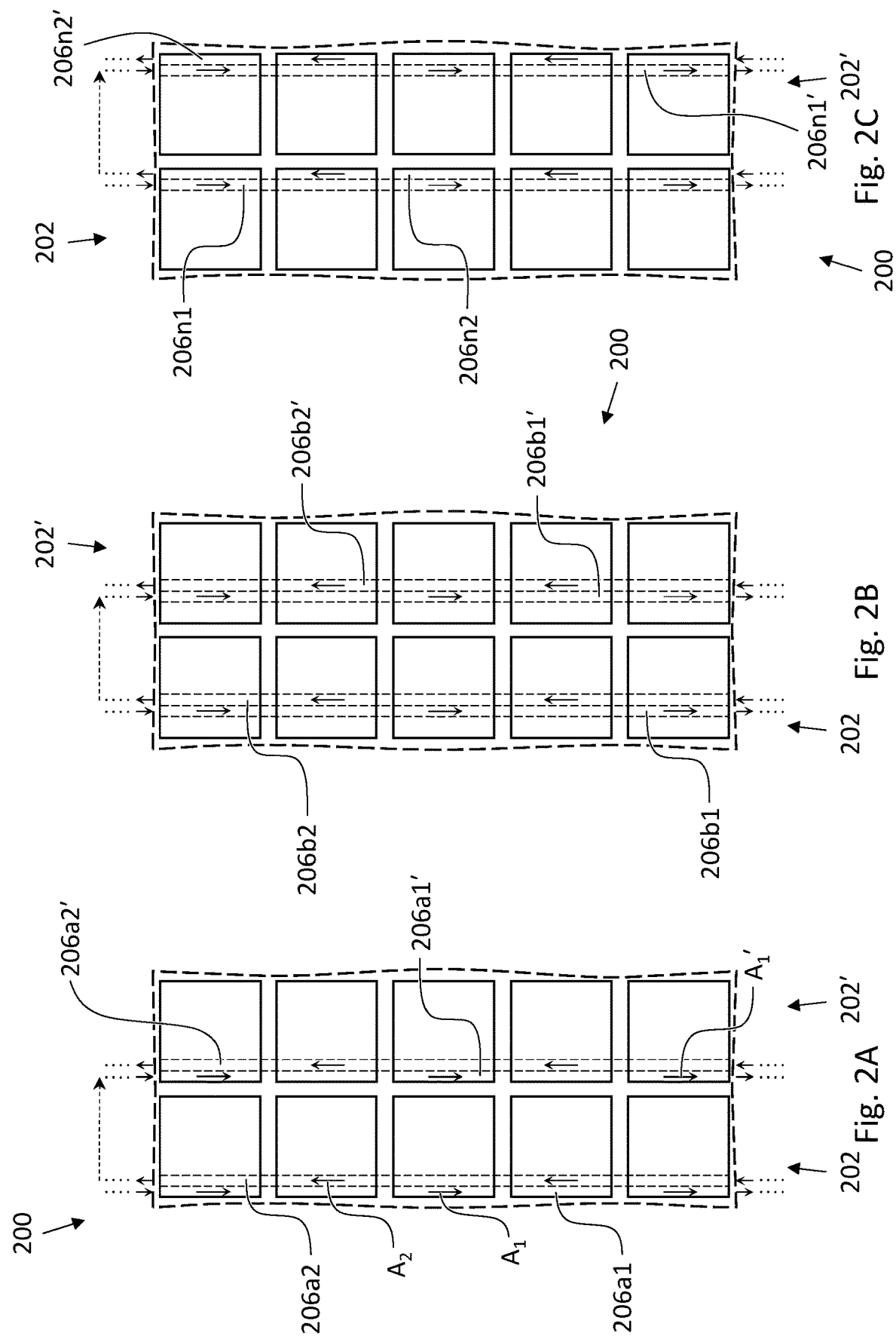

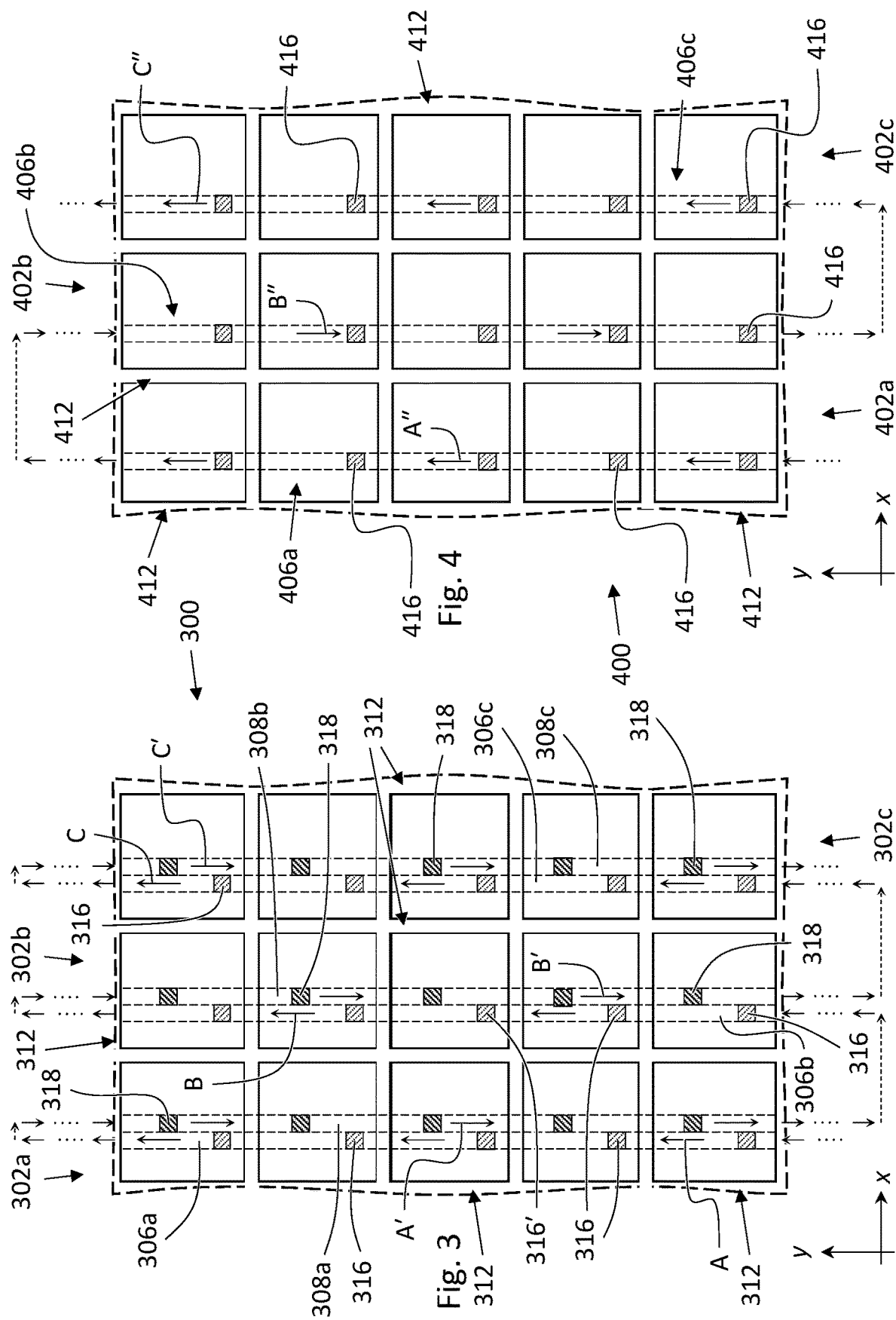

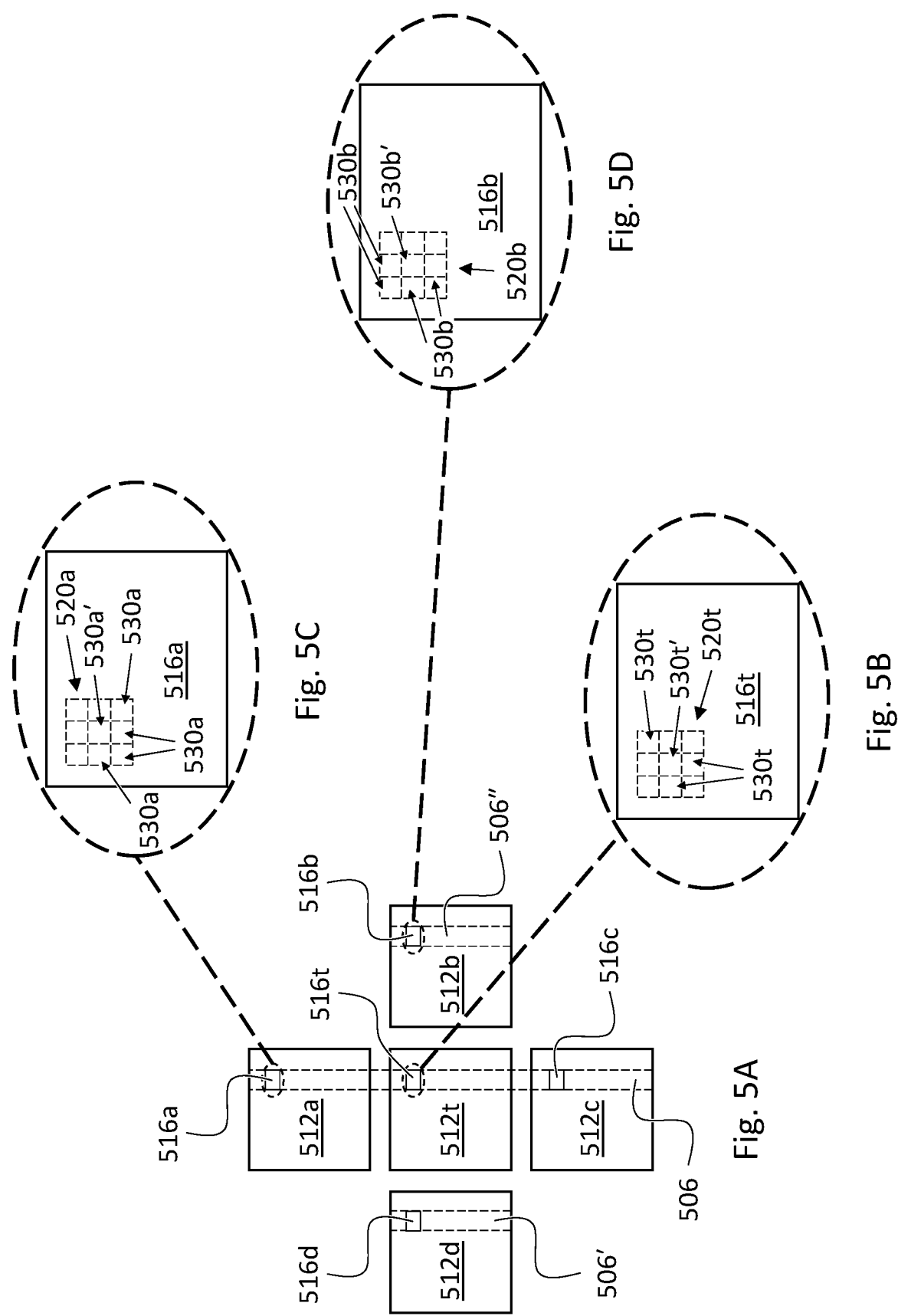

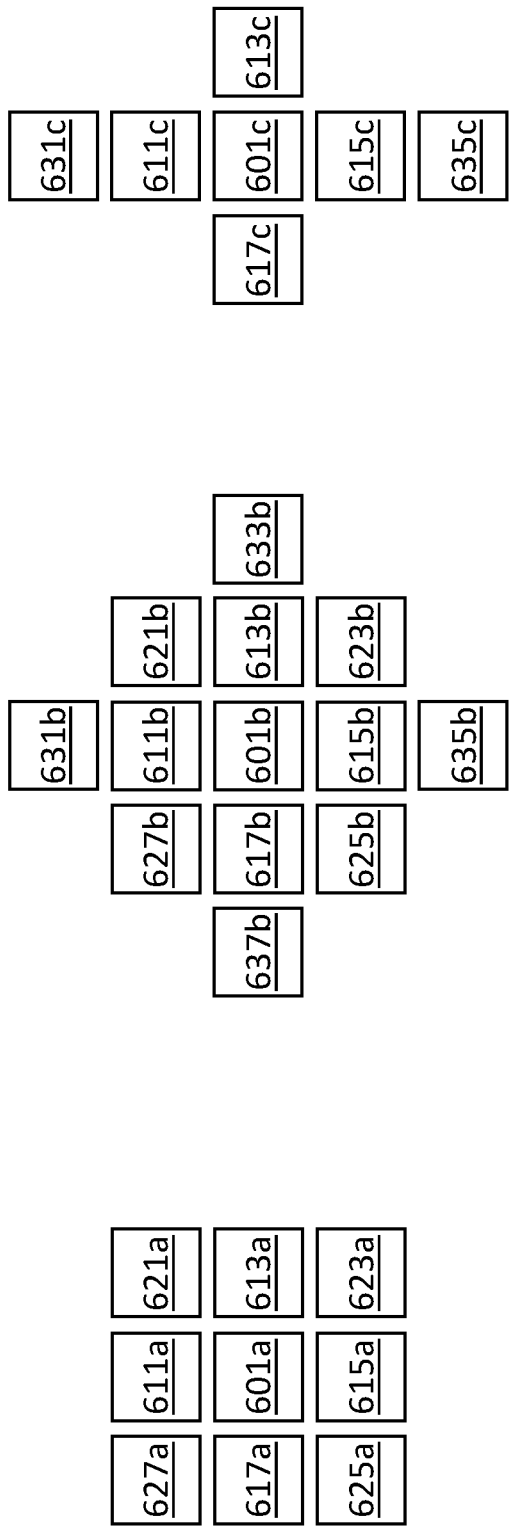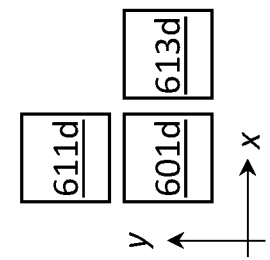

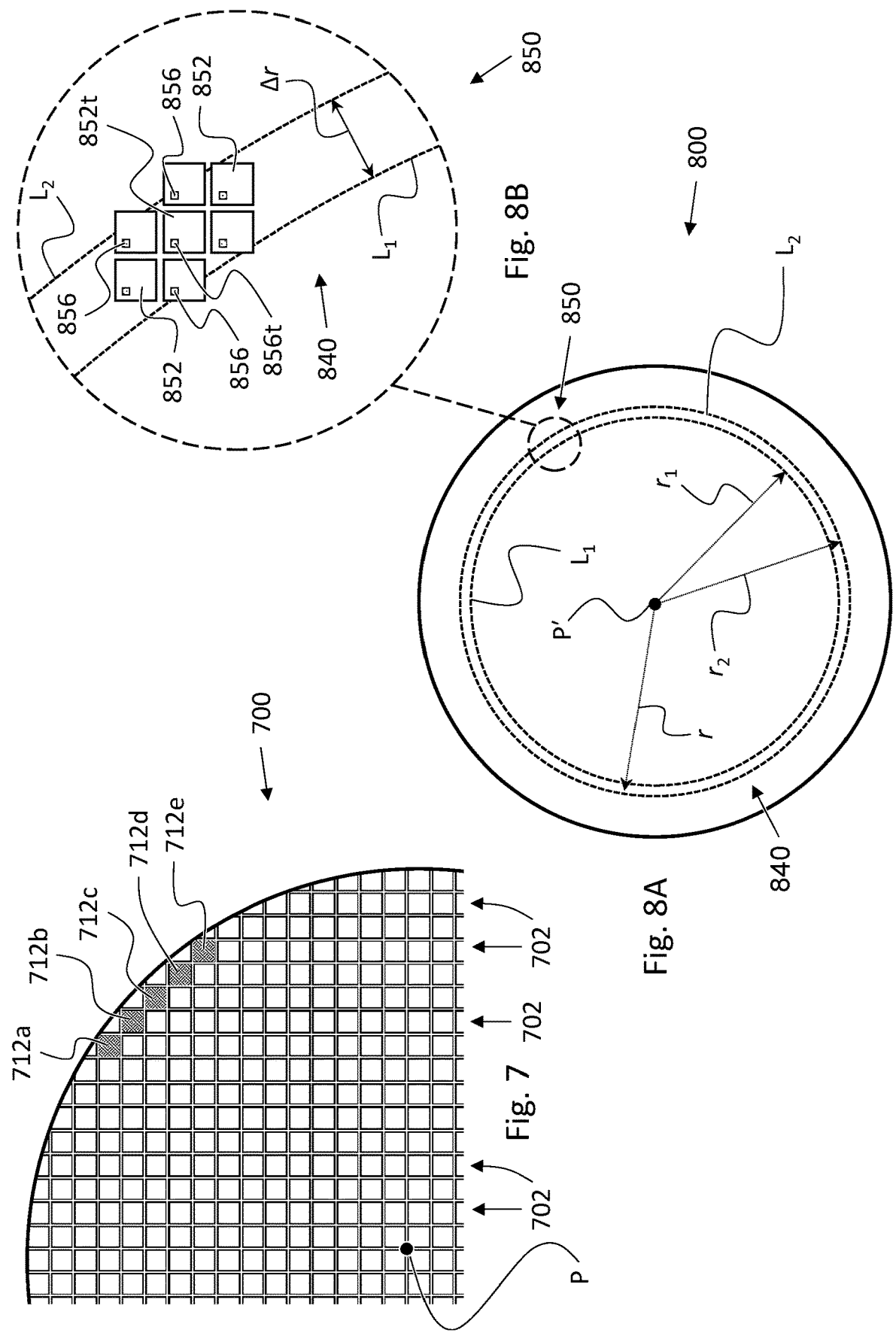

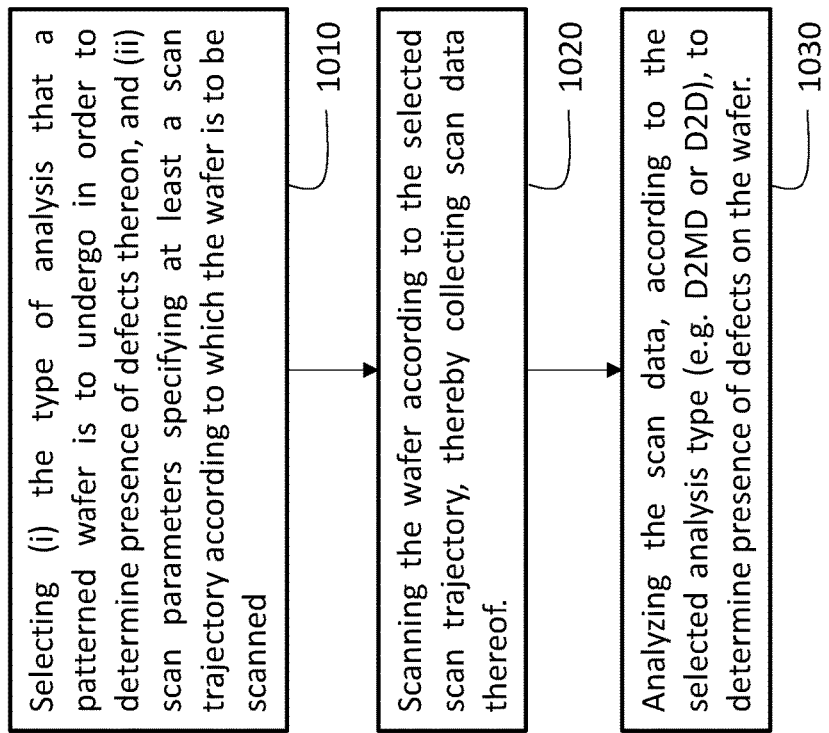
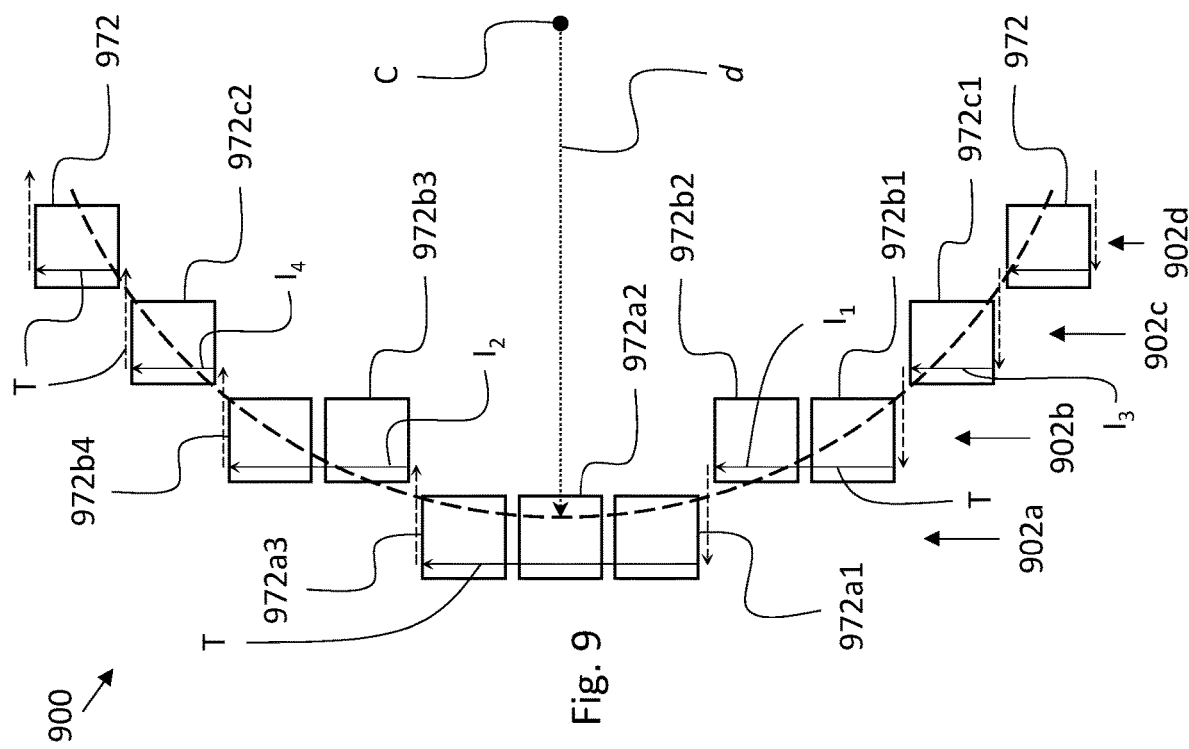

| Slice 2m-1, DC n-2 | Slice 2m, DC n-2 |
| Slice 2m-1, DC n-1 | Slice 2m, DC n-1 |
| Slice 2m-1, DC n | Slice 2m, DC n |
| Slice 2m-1, DC n+1 | Slice 2m, DC n+1 |
| Slice 2m-1, DC n+2 | Slice 2m, DC n+2 |

Fig. 13C

| Slice m, DC n-2 | Slice m, DC n-1 | Slice m, DC n | Slice m, DC n+1 | Slice m, DC n+2 | Empty |

Fig. 13B

| Slice 2m-1, DC n-1 | Slice 2m, DC n-1 |
| Slice 2m-1, DC n | Slice 2m, DC n |
| Slice 2m-1, DC n+1 | Slice 2m, DC n+1 |

Fig. 13A

DIE-TO-MULTI-DIE WAFER INSPECTION

TECHNICAL FIELD

The present disclosure relates generally to wafer inspection.

BACKGROUND

In order to detect defects on wafers, defect signals have to be distinguished from noise. With the shrinking of design rules, increasingly smaller defects have to be detected and the distinction becomes commensurately harder. Previously, defect detection was mainly limited by laser power and detector noise. Currently, state-of-the-art wafer analysis tools and techniques are mostly limited by wafer noise. In particular, wafer noise may resemble fluctuations arising from process variation across the wafer, making the distinction therebetween (and, consequently, the detection of defects) especially challenging. There remains an unmet need in the art for wafer analysis techniques, which allow accurately and efficiently distinguishing defect signals from wafer noise.

SUMMARY

Aspects of the disclosure, according to some embodiments thereof, relate to wafer inspection. More specifically, but not exclusively, aspects of the disclosure, according to some embodiments thereof, relate to die-to-multi-die wafer inspection. Still, more specifically, but not exclusively, aspects of the disclosure, according to some embodiments thereof, relate to scanning trajectories on a patterned wafer in die-to-multi-die wafer inspection.

Thus, according to an aspect of some embodiments, there is provided a computer-based method for obtaining and analyzing multi-die scan data of a patterned wafer. The method includes sequentially implementing:

An operation of scanning a respective plurality of sets of slices on a wafer: Each set includes a selection of slices on a respective die-column from the wafer (so that the number of slices in each set is smaller than the total number of slices in each die-column or at least in the respective die-column). Each slice in each set is analogous to a single slice, respectively, in each of the other sets.

Per at least some tested slice segments in a multiplicity of slice segments in the plurality of sets, an operation of performing die-to-multi-die (D2MD) analysis of scan data of the tested slice segment to detect defects therein: The D2MD analysis takes into account as reference, respectively, scan data of two or more reference slice segments in the multiplicity, which are analogous to the slice segment and located on two or more die-columns, respectively, on the wafer.

According to some embodiments of the method, in at least some of the implementations, slices in at least some of the sets are partially scanned. At least some of the partially scanned slices include disjoint slice intervals.

According to some embodiments of the method, in each implementation, the slices are fully scanned.

According to some embodiments of the method, each implementation further includes an operation, following the operation of performing the D2MD analysis, wherein analysis results are saved and the scan data, obtained in the operation of scanning the respective plurality of sets, is discarded.

According to some embodiments of the method, the D2MD analysis of the scan data of a tested slice segment from the multiplicity of slice segments includes generating difference images between block images of the tested slice segment and each of the respective reference slice segments.

According to some embodiments of the method, analogous slices are scanned in a same direction.

According to some embodiments of the method, consecutively scanned slices in each set are scanned in alternating directions.

According to some embodiments of the method, in at least some of the implementations, the number of slices in each set, in the respective plurality of sets, is even.

According to some embodiments of the method, in at least some of the implementations, each set, in the respective plurality of sets, includes two or more adjacent slices.

According to some embodiments of the method, in at least some of the implementations, per at least some of the tested slice segments in the multiplicity of slice segments, a die-column, on which the tested slice segment is located, is included in the respective two or more die-columns on which the respective two or more reference slice segments are located.

According to some embodiments of the method, in at least some of the implementations, per at least some of the slice segments in the multiplicity of slice segments, a die-column, adjacent to the die-column on which the tested slice segment is located, is included in the respective two or more die-columns on which the two or more reference slice segments are located.

According to some embodiments of the method, in the at least some of the implementations, per at least some of the tested slice segments in the multiplicity of slice segments (that are not located on an edge die), the respective two or more reference slice segments include four slice segments that are located on four dies, respectively. Each of the four dies is adjacent to a die on which the tested slice segment is located.

According to some embodiments of the method, in the at least some of the implementations, per each tested slice segment in the multiplicity of slice segments that is not located on an edge die, the respective two or more reference slice segments include, in addition to the four slice segments that are located on the four dies adjacent to the die on which the tested slice segment is located, at least one slice segment that is located on a next-nearest neighbor die on a same die-column as the tested slice segment.

According to some embodiments of the method, in the at least some of the implementations, per some of the tested slice segments in the multiplicity of slice segments that are located on dies that are not edge dies, the respective two or more reference slice segments include eight slice segments that are located on eight dies, respectively. Each of the eight dies is a nearest neighbor to the die on which the tested slice segment is located.

According to some embodiments of the method, when process variation on the wafer exhibits a radial signature, in at least some of the implementations, per at least one tested slice segment in the multiplicity of slice segments, the respective two or more reference slice segments include one or more slice segments positioned at substantially the same distance, from a center of the wafer, as the tested slice segment.

According to some embodiments of the method, in at least some of the implementations, the respective operation of performing the D2MD analysis of scan data of the tested slice segment includes computing covariances between scan data, associated with groups of pixels in the tested slice segment, and scan data associated with analogous groups of pixels in each of the respective two or more reference slice segments.

According to some embodiments of the method, the method is sequentially implemented so as to fully scan the wafer or a target region thereof.

According to some embodiments of the method, the operation of scanning and the operation of performing the D2MD analysis are sequentially implemented until all slices, in each of the to be scanned die-columns are scanned.

According to some embodiments of the method, a number of slices in each of the plurality of sets is selected such that a total scan duration, throughput, maximum amount of memory in use during scan, and defect detection accuracy, is optimized, and/or or a target trade-off there between is achieved.

According to some embodiments of the method, each of the at least some tested slice segments, and the two or more reference slice segments analogous thereto, are scanned within a time interval, such that an expected process variation there between (i.e. between the tested slice segment and the reference slice segments analogous thereto) is smaller than a predefined threshold.

According to some embodiments of the method, the operation of performing the D2MD analysis is performed in real-time or near real-time.

According to some embodiments of the method, the operation of scanning the respective plurality of sets in an (n+1)-th implementation at least partially overlaps with the operation of performing the D2MD analysis of scan data in the n-th implementation. $1 \le n \le N$, wherein $N \ge 2$ is the total number of implementations.

According to some embodiments of the method, in each implementation, each set of slices, in the respective plurality of sets, consists of a single slice.

According to some embodiments of the method, in at least some of the implementations, the operation of scanning the respective plurality of sets, includes scanning each set in a multiplicity of perspectives, and, the operation of performing the D2MD analysis includes taking into account cross-perspective covariances.

According to some embodiments of the method, the operation of performing the D2MD analysis includes first running a D2MD algorithm per perspective, followed by a multi-perspective algorithm implemented on outputs of the D2MD algorithm, which takes into account cross-perspective covariances.

According to some embodiments of the method, the scanning is optical.

According to an aspect of some embodiments, there is provided a computerized system for obtaining and analyzing multi-die scan data of a patterned wafer. The system includes scanning equipment and a computational module. The scanning equipment is configured to sequentially scan sets of slices in a controllably selectable plurality of sets of slices on a patterned wafer. Each set includes a selection of slices from a respective die-column on the wafer Each slice in each set is analogous to a single slice, respectively, in each of the other sets. The computational module is configured to, per at least some tested slice segments in a multiplicity of slice segments included in the plurality of sets, perform D2MD analysis of scan data of the tested slice segment to detect defects therein, taking into account as reference, respectively, scan data of two or more reference slice segments in the multiplicity, which are analogous to the slice segment and located on two or more die-columns, respectively, on the wafer.

According to some embodiments of the system, the scan equipment is configured to realize scan trajectories in which slices in at least some of the sets are only partially scanned, and such that at least some of the partially scanned slices include disjoint slice intervals.

According to some embodiments of the system, the system is further configured to successively scan, and perform D2MD analysis with respect to, two or more pluralities of sets slices, so as to fully scan the wafer or a target region thereof.

According to some embodiments of the system, the two or more pluralities of sets of slices are distinct from one another.

According to some embodiments of the system, the computational module may further be configured to select a number of slices in each of the plurality of sets is selected such that a total scan duration, throughput, maximum amount of memory in use during scan, and defect detection accuracy, is optimized, and/or or a target trade-off there between is achieved.

According to some embodiments of the method, the system is configured such that each of the at least some tested slice segments, and the two or more reference slice segments analogous thereto, are scanned within a time interval, such that an expected process variation there between is smaller than a predefined threshold.

According to some embodiments of the system, the computational module is further configured to perform the D2MD analysis in real-time or near real-time.

According to some embodiments of the system, the system is further configured to scan an (n+1)-th plurality from the two or more pluralities of sets of slices, and simultaneously perform the D2MD analysis of obtained scan data of an n-th plurality from the two or more pluralities of sets of slices. $1 \le n \le N$, wherein $N \ge 2$ is the total number of pluralities of sets of slices in the two or more pluralities of set slices.

According to some embodiments of the system, the computational module is configured to—following the D2MD analysis of scan data of a plurality of sets from the two or more pluralities of sets—save results, obtained in the D2MD analysis, and discard the scan data.

According to some embodiments of the system, the computational module is configured to—as part of the D2MD analysis of scan data of a tested slice segment from the multiplicity of slice segments—generate difference images between block images of the tested slice segment and each of the respective reference slice segments.

According to some embodiments of the system, the scanning equipment is configured to scan, or allow scanning, analogous slices in a same direction.

According to some embodiments of the system, the scanning equipment is configured to scan, or allow scanning, consecutively scanned slices (in each set of slices) in alternating directions.

According to some embodiments of the system, wherein a number of slices in each set in at least one of the two pluralities of sets is even.

According to some embodiments of the system, each set in at least one of the two pluralities of sets includes two or more adjacent slices.

According to some embodiments of the system, per at least some tested slice segments in the multiplicity of slice segments, a die-column, on which the tested slice segment is located, is included in the respective two or more die-columns on which the respective two or more reference slice segments are respectively located.

According to some embodiments of the system, per at least some tested slice segments in the multiplicity of slice segments, a die-column, adjacent to the die-column on which the tested slice segment is located, is included in the two or more die-columns on which the respective two or more reference slice segments are respectively located.

According to some embodiments of the system, per each of the at least some tested slice segments that is not located on an edge die, the respective two or more reference slice segments include four slice segments that are located on four dies, respectively. Each of the four dies is adjacent to the die on which the tested slice segment is located.

According to some embodiments of the system, the respective two or more reference slice segments include, in addition to the four reference slice segments that are located on the four dies adjacent to the die on which the tested slice segment is located, at least one reference slice segment located on a next-nearest neighbor die on a same die-column as the tested slice segment.

According to some embodiments of the system, in the at least some of the implementations, per some of the tested slice segments in the multiplicity of slice segments that are located on dies that are not edge dies, the respective two or more reference slice segments include eight slice segments that are located on eight dies, respectively. Each of the eight dies is a nearest neighbor to the die on which the tested slice segment is located.

According to some embodiments of the system, when process variation on the wafer exhibits a radial signature, per at least one tested slice segment in the multiplicity of slice segments, the respective two or more reference slice segments include one or more slice segments positioned at substantially the same distance, from a center of the wafer, as the tested slice segment.

According to some embodiments of the system, the computational module is configured to, as part of the D2MD analysis of scan data of at least some of the tested slice segments, compute covariances between scan data, associated with groups of pixels in the tested slice segment, and scan data associated with analogous groups of pixels in each of the respective two or more reference slice segments.

According to some embodiments of the system, each set of slices consists of a single slice.

According to some embodiments of the system, the scanning equipment is further configured to scan at least some of the sets of slices in a multiplicity of perspectives. The computational module is configured to perform, or allow performing, the D2MD analysis taking into account cross-perspective covariances.

According to some embodiments of the system, the computational module is configured to perform the D2MD analysis by first implementing a D2MD analysis per perspective, and next a multi-perspective analysis on outputs of the D2MD analysis, which takes into account cross-perspective covariances.

According to some embodiments of the system, the computational module is further configured to preselect a scan trajectory from a predefined set of scan trajectories such that, such that: (i) a goal function, selected from a total scan duration, throughput, maximum amount of memory in use during the scan, and defect detection accuracy, is optimized, or (ii) a target trade-off there between is achieved. The predefined set of scan trajectories includes at least a first multi-implementation scan trajectory and a second multi-implementation scan trajectory. The first scan trajectory specifies, in at least some of the implementations, scanning two slices from each die-column in alternating directions. The second scan trajectory specifies, in at least some of the implementations, scanning a single slice in each die-column with consecutively scanned slices being scanned in alternating directions.

According to some embodiments of the system, the predefined set of scan trajectories further includes a raster scan trajectory, wherein the wafer, or a target region thereof, is fully scanned in a single implementation.

According to some embodiments of the system, the predefined set of scan trajectories further includes a scan trajectory such that in each implementation a respective plurality of dies, arranged in respective a ring-like arrangement about a center of the wafer, is fully scanned.

According to some embodiments of the system, the scanning equipment includes an optical-based imager.

According to an aspect of some embodiments, there is provided a non-transitory computer-readable storage medium storing instructions that cause a wafer inspection system to implement the above-described method.

According to some embodiments of the storage medium, the wafer inspection system is the above-described computerized system.

According to an aspect of some embodiments, there is provided a computer-based method for obtaining and analyzing scan data of a patterned wafer. The method includes:
- An initial operation, wherein a scan trajectory is selected from a predefined set of scan trajectories such that:
  - a goal function, selected from a total scan duration, throughput, maximum amount of memory in use during the scan, and defect detection accuracy, is optimized; or
  - a target trade-off there between is achieved.
- An operation of scanning the wafer according to the selected scan trajectory.
- An operation of analyzing scan data, collected in the scan, to determine presence of defects on the wafer.

The predefined set of scan trajectories includes at least a first multi-implementation scan trajectory and a second multi-implementation scan trajectory. The first scan trajectory specifies, in at least some of the implementations, scanning two slices from each die-column in alternating directions. The second scan trajectory specifies, in at least some of the implementations, scanning a single slice in each die-column with consecutively scanned slices being scanned in alternating directions.

According to some embodiments of the method, the predefined set of scan trajectories further includes a raster scan trajectory, wherein the wafer, or a target region thereof, is fully scanned in a single implementation.

According to some embodiments of the method, the predefined set of scan trajectories further includes a scan trajectory such that in each implementation a respective plurality of dies, arranged in respective a ring-like arrangement about a center of the wafer, is fully scanned.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIGS. 2A-2C schematically depict order of scanning of sets of slices on a patterned wafer, and order of scanning thereof, according to some specific embodiments of the method of FIG. 1;

FIG. 3 schematically depicts a scan trajectory on a patterned wafer undergoing scanning according to some specific embodiments of the method of FIG. 1;

FIG. 4 schematically depicts a scan trajectory on a patterned wafer undergoing scanning according to some specific embodiments of the method of FIG. 1;

FIG. 5A presents a selections of reference dies for die-to-multi-die analysis of scan data, according to some specific embodiments of the method of FIG. 1;

FIGS. 5B to 5D depict analogous groups of pixels on slice segments corresponding to block images on a tested die and two of the references dies of FIG. 5A, according to some embodiments;

FIGS. 6A to 6E present five different selections, respectively, of reference dies for die-to-multi-die analysis of scan data, according to some specific embodiments of the method of FIG. 1;

FIG. 7 presents a selection of reference dies for die-to-multi-die analysis of scan data, according to some specific embodiments of the method of FIG. 1, wherein a process variation on a tested wafer displays a radial signature;

FIGS. 8A and 8B present a selection of reference dies for die-to-multi-die analysis of scan data, according to some specific embodiments of the method of FIG. 1, wherein a process variation on the tested wafer displays a radial signature;

FIG. 9 presents a scan trajectory on a tested wafer exhibiting radial process variation, according to some specific embodiments of the method of FIG. 1;

FIG. 10 presents a flowchart of a method for patterned wafer inspection, according to some embodiments;

FIGS. 13A-13C schematically depict memory allocation in a random-access memory of the system of FIG. 11, in different implementations, respectively, of the method of FIG. 10, according to some embodiments.

DETAILED DESCRIPTION

Figure 1:
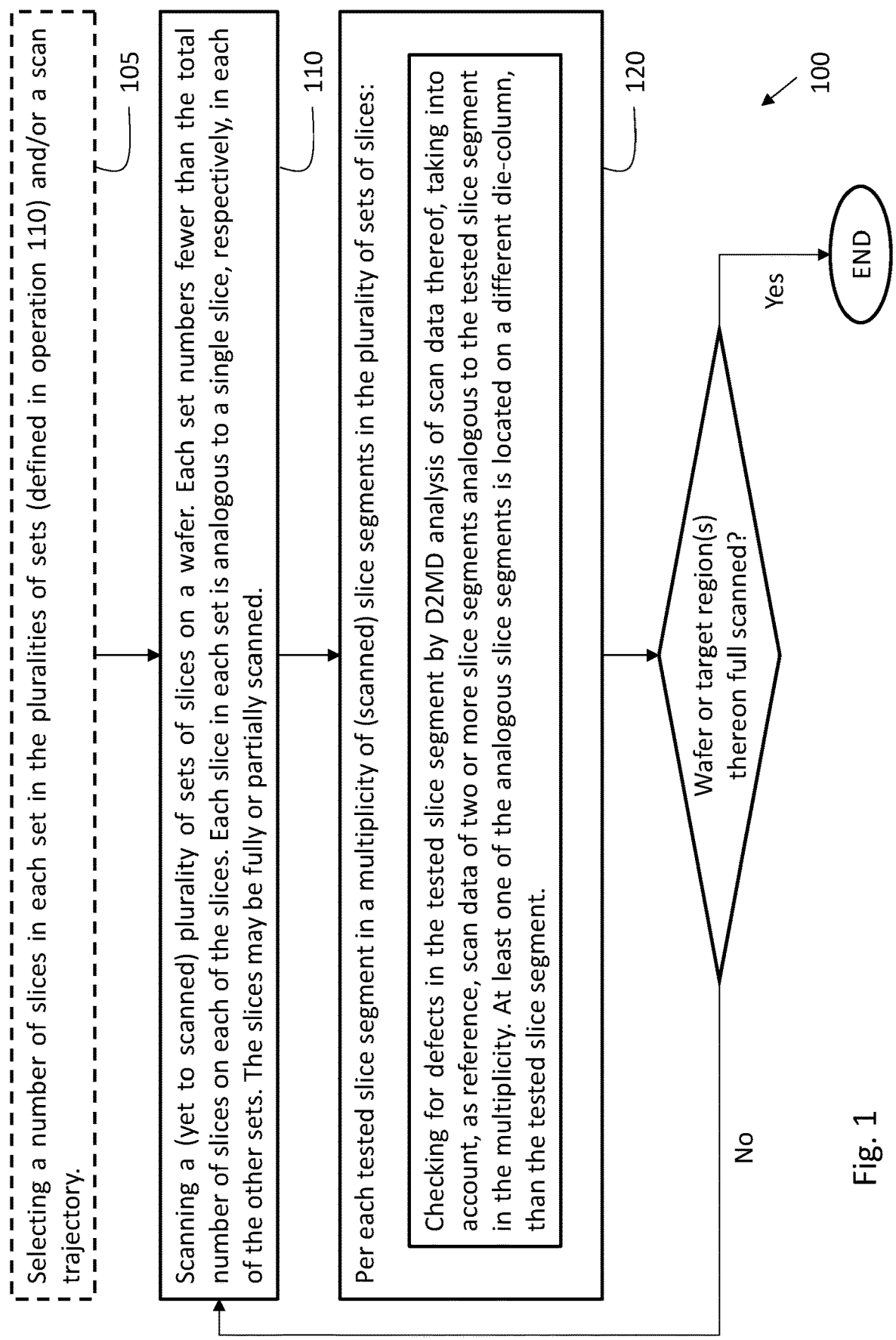
FIG. 1 presents a flowchart of a method for die-to-multi-die wafer inspection, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

For ease of description, in some of the figures a two-dimensional coordinate system is introduced. It is noted that the orientation of the coordinate system relative to a depicted object may vary from one figure to another.

As used herein, the term "set" is to be understood in a broad manner and may refer to either a plurality of elements or a single element (i.e. a single-element set). Similarly, the term "group" is to be understood in a broad manner and may refer to either a plurality of elements or a single element.

Patterned-wafer defect detection protocols may involve comparison of scan data of different dies particularly, when applied in order to detect defects in areas containing non-periodic patterns, such as random logic areas. Typically, scan data of a slice is evaluated separately from scan data of other slices. A collective analysis, wherein scan data of analogous areas on different slices are evaluated in an integrated manner—that is, a die-to-multi-die (D2MD) analysis wherein scan data of dies on different slices are jointly taken into account—is expected to yield higher defect detection rates. Further, taking into account scan data from one or more dies, located on different die-columns, may be advantageous when process variation (PV) between adjacent dies is significant (e.g. when the dies are large), and/or when the minimum PV is not vertical, e.g. when the signature of the PV is radial.

To date, constraints on memory, requirements on throughput, as well as temporal effects, impacting the wafer and the inspection system—which become more manifest the greater the differences in the collection times of scan data of analogous areas—have tended to limit the practicality of D2MD wafer inspection. There is thus an unmet need in the art for D2MD wafer inspection systems, which economize memory usage, expedite throughput, and diminish the impact of temporal effects.

The present disclosure, according to some embodiments thereof, provides methods and systems, which facilitate D2MD wafer analysis. That is, detection of defects within a first scanned area on a first die taking into account scan data of a plurality of scanned areas, analogous to the first scanned area, on two or more other dies, particularly, when one or more of the other dies is located on a different die-column than the first scanned area.

Methods

According to an aspect of some embodiments, there is provided a computerized method for die-to-multi-die (D2MD)-based wafer analysis. FIG. 1 presents a flowchart of such a method, a method 100, according to some embodiments. Method 100 may include implementing, or serially implementing:

An operation 110, wherein a plurality of sets of slices on a (patterned) wafer is scanned. Each set may include k slices from a respective die-column (on the wafer), which may be pre-selected as described below (so that each set includes a respective selection of slices from the slices on the respective die-column). k<K, wherein K is a total number of slices on each of the die-columns. Each slice in each set is analogous to a single slice, respectively, in each of the other sets. Each slice may be partially or fully scanned.

An operation 120, wherein each tested slice segment (i.e. a scanned slice segment that is analyzed for the presence of defects therein) in a multiplicity of slice segments (segments of slices), in the plurality of sets of slices, is analyzed for the presence of defects by performing a D2MD analysis. In the D2MD analysis, the scan data of the tested slice segment are analyzed taking into account, as reference data, scan data of two or more slice segments in the multiplicity, which are analogous to the slice segment.

In each implementation of operation 110, sets of slices, including or consisting of yet to be scanned slices (i.e. previously unscanned slices), may be scanned. Operations 110 and 120 may continue being (serially) implemented until the wafer (or a target region thereof) is fully scanned. More specifically, according to some embodiments, operations 110 and 120 may continue being implemented until each of the die-columns on the wafer is fully scanned. According to some other embodiments, wherein only a target region of a wafer is to be inspected, operations 110 and 120 may continue being implemented until each of the dies in the target region is fully scanned.

According to some embodiments, operation 120 may be implemented simultaneously to operation 110. That is, in such embodiments, the analysis of the scan data is performed in real-time or near real-time. More precisely, in each implementation, operation 120 may be commenced once sufficient scan data have been collected to allow checking for the presence of defects in at least one slice segment (scanned in the present implementation). According to some such embodiments, once scan data, pertaining to a tested slice segment, have been analyzed for the presence of defects in the slice segment, and are not to be further utilized (e.g. as reference data), the results of the analysis may be saved and the scan data may be deleted. The freed-up memory may be used to store new scan data, which is collected as the scan continues. Alternatively, according to some embodiments, all the scan data, collected in an implementation, are kept saved until the implementation is completed—that is, until the scan data, corresponding to all slice segments in each of the slices scanned during the implementation, have been analyzed and the analysis results have been saved—and only then are the scan data (collected during the implementation) deleted.

According to some alternative embodiments, method 100 may include serially implementing operation 110 with the implementations of operation 120 being deferred to a later time. That is, in such embodiments, the analysis of the scan data may be performed "offline". In this regard, it is noted that even when the analysis of the scan data is to be performed offline, it may nevertheless be advantageous to serially implement operation 110 (rather than fully scanning all slices on a die-column before proceeding to a next die-column). This is because (when operation 110 is serially implemented) scan data of analogous slice segments located on different die-columns are collected within a far smaller time interval as compared to when all slice segments on a die-column are scanned before proceeding to a next die-column. Hence, in such embodiments, longer-term temporal physical effects and instabilities, impacting the setup, are comparatively less manifest over analogous slice segments from different die-columns, potentially allowing for higher-accuracy defect detection.

According to some embodiments, irrespectively of whether the implementations of operation 120 are performed online, the scan data are saved for later use, for example, as reference and/or for debugging purposes.

According to some embodiments, wherein at least some of the sets are only partially scanned (in the sense that one or more slices in the at least some of the sets are partially scanned), a plurality of disjoint slice intervals on each slice may be scanned, as described, for example, in the description of FIG. 9 below.

To render the discussion more concrete, and thereby facilitate the description, reference is now made to FIGS. 2A-2C. FIGS. 2A-2C schematically depict scanning of a wafer 200 (partially shown) during n≥3 serial implementations of operations 110 (and operations 120 when implemented in real-time), according to some specific embodiments of method 100. While only two of the die-columns on wafer 200—adjacent die-columns 202 (first die-column) and 202' (second die-column)—are depicted, it is to be understood that in each implementation all the die-columns on wafer 200 (or a target area of wafer 200) are (partially) scanned.

More specifically, FIG. 2A schematically depicts scanning during a first implementation of operation 110 along a first slice 206a1 and a second slice 206a2 on first die-column 202, and along a first slice 206a1' and a second slice 206a2' on second die-column 202'. Slice 206a1 and slice 206a1' are analogous. Slice 206a2 and slice 206a2' are analogous. Similarly, in each of the other die-columns (not shown) a respective first slice, analogous to first slice 206a1, and a respective second slice, analogous to second slice 206a2, may also be scanned in the first implementation of operation 110.

FIG. 2B schematically depicts scanning, during a second implementation of operation 110 along a third slice 206b1 and a fourth slice 206b2 on first die-column 202, and along a third slice 206b1' and a fourth slice 206b2' on second die-column 202'. Slice 206b1 and slice 206b1' are analogous. Slice 206b2 and slice 206b2' are analogous. Similarly, in each of the other die-columns a respective third slice, analogous to third slice 206b1, and a respective fourth slice, analogous to fourth slice 206b2, may also be scanned in the second implementation of operation 110.

FIG. 2C schematically depicts scanning during an n-th implementation of operation 110 along a (2n−1)-th slice 206n1 and a 2n-th slice 206n2 on first die-column 202, and along a (2n−1)-th slice 206n1' and a 2n-th slice 206n2' on second die-column 202'. Slice 206n1 and slice 206n1' are analogous. Slice 206n2 and slice 206n2' are analogous. Similarly, in each of the other die-columns a respective (2n−1)-th slice, analogous to (2n−1)-th slice 206n1, and a respective 2n-th slice, analogous to 2n-th slice 206n2, may also be scanned in the n-th implementation of operation 110.

As used herein, two or more slices (e.g. slices 206a1 and 206a1', slices 206b2 and 206b2')—defined by a scanning trajectory implemented by a "cursor" of an imager—are "analogous" when extending along respective strips of a wafer, which, were it not for fabrication imperfections and imperfections in the setup (e.g. mechanical vibrations, thermal fluctuations, misalignment of the stage axes on which the wafer is placed, and so on), would be identical in the sense of having the same dimensions and including same structures (such as transistors, memory components, discrete components).

In FIGS. 2A-2C, each of the die-columns is shown scanned from left-to-right. That is, first slice 206a1 is the leftmost slice on first die-column 202, second slice 206a2 is the second leftmost slice on first die-column 202, third slice 206b1 is the third leftmost slice on first die-column 202, and so on, while (2n−1)-th slice 206n1 is the second rightmost slice on first die-column 202, and 2n-th slice 206n2 is the rightmost slice on first die-column 202, and similarly for second die-column 202'. It is to be understood, however, that the slices within each set may be scanned in any order. Moreover, according to some embodiments, not depicted in FIGS. 2A-2C, the order of scanning of the die-columns may be inverted from one implementation of operation 110 to the next implementation thereof by continuing to scan as the stage, on which the wafer is placed, is translated back from right to left (thereby potentially shortening the overall scan duration). Thus, for example, according to some such embodiments, in a second implementation of operation 110, second die-column 202' is scanned before first die-column 202, with second slice 206b2' being scanned before first slice 206b1', which, in turn, is scanned before second slice 206b2, which, in turn, is scanned before first slice 206b1.

It is noted that in the embodiments depicted in FIGS. 2A-2C, in each implementation of operation 110, consecutively scanned slices, whether from the same set or not, are scanned in opposite directions. As a non-limiting example, in FIG. 2A, first slice 206a1 (on first die-column 202) is shown scanned from top-to-bottom (as indicated by arrows $A_1$), second slice 206a2 (on first die-column 202) is shown scanned from bottom-to-top (as indicated by arrows $A_2$), first slice 206a1' (on second die-column 202') is shown scanned from top-to-bottom (as indicated by arrows $A_1'$), and so on.

In addition, while in FIGS. 2A-2C the number of slices in each set (in the plurality of sets of slices) is two (so that each die-column includes 2n slices), it is to be understood that the number of slices in each set may be one (i.e. so that each set consists of a single slice, as depicted, for example, in FIG. 4), may be an odd number, or may be an even number greater than two. Each possibility corresponds to separate embodiments.

Referring also to FIG. 3, FIG. 3 depicts a realization of method 100, according to some specific embodiments thereof, wherein, in at least some implementations of operation 110, a pair of slices is scanned on each die-column (similarly to the realization of method 100 depicted in FIGS. 2A-2C). More specifically, consecutive (partial) scanning of successively disposed die-columns on a wafer 300—during a single implementation of operation 110—is depicted. Three die-columns 302 on wafer 300 are partially shown: a first die-column 302a, a second die-column 302b, and a third die-column 302c. Second die-column 302b is located between, and is adjacent to each of, first die-column 302a and third die-column 302c.

A first slice 306a, extending along first die-column 302a, is scanned from bottom-to-top, as indicated by arrows A. A second slice 308a, extending along first die-column 302a, is scanned from top-to-bottom, as indicated by arrows A'. A third slice 306b, extending along second die-column 302b, is scanned from bottom-to-top, as indicated by arrows B. A fourth slice 308b, extending along second die-column 302b, is scanned from top-to-bottom, as indicated by arrows B'. A fifth slice 306c, extending along third die-column 302c, is scanned from bottom-to-top, as indicated by arrows C. A sixth slice 308c, extending along third die-column 302c, is scanned from top-to-bottom, as indicated by arrows C'.

Slices 306a, 306b, and 306c are analogous to one another. Similarly, slices 308a, 308b, and 308c are analogous to one another. It is noted that in the depicted implementation of operation 110, analogous slices are scanned in the same direction (e.g. each of slices 306a, 306b, and 306c is scanned from bottom-to-top). Consequently, analogous slice segments are scanned in the same direction, so that, in comparing analogous slice segments, image pre-processing to account for scanning in opposite directions (e.g. correcting for misalignments arising when scanning in opposite directions) is not required. More generally, the same may apply whenever each of the sets of slices numbers an even number of slices (e.g. four, six).

As a non-limiting example, according to some embodiments and as depicted in FIG. 3, the slices in each pair of slices (extending along a same die-column) are adjacent to one another. Thus, for instance, slices 306a and 308a on first die-column 302a are adjacent to one another.

Also indicated are dies 312 (not all of which are numbered) and scanned slice segments 316 and 318 (not all of which are numbered) on each of dies 312. Each of slice segments 316 constitutes a respective segment of one of slices 306 and defines a scanned area corresponding to a respective block image. Each of slice segments 318 constitutes a respective segment of one of slices 308 and defines a scanned area corresponding to a respective block image. Slice segments 316 are analogous to one another. More specifically, slice segments 316 are said to be "analogous" to one another in the sense that were it not for fabrication imperfections and imperfections in the setup (whether mechanical and/or optical), slice segments 316 would be identical, i.e. (i) have the same dimensions, (ii) be identically positioned within the respective dies, and (iii) be characterized by the same topography (i.e. containing the same structures). Similarly, slice segments 318 are analogous to one another.

Since slice segments 316 are analogous to one another, scan data thereof (i.e. respective block images thereof) may be used to perform a D2MD analysis to detect defects in one or more of slice segments 316. For example, block images of two or more analogous slice segments from slice segments 316 may be used as references (i.e. reference images) in a D2MD analysis checking for the presence of defects on another one of slices segments 316 (analogous thereto), such as a tested slice segment 316'. Various non-limiting examples of selections of slice segments, to be used as reference, are shown below in FIGS. 5A and 6A-6E.

According to some alternative embodiments, not depicted in FIG. 3, each set of slices may include 2m slices, wherein m≥2 (and is an integer).

Referring to FIG. 4, FIG. 4 depicts a realization of method 100, according to some specific embodiments thereof, wherein, in at least some of the implementations of operation 110, a single slice is scanned on each die-column. More specifically, successive (partial) scanning of consecutively disposed die-columns on a wafer 400 (partially shown)—during a single implementation of operation 110—is depicted. Three die-columns 402 on wafer 400 are partially shown: a first die-column 402a, a second die-column 402b, and a third die-column 402c. Second die-column 402b is disposed between, and is adjacent to each of, first die-column 402a and third die-column 402c.

A first slice 406a, extending along first die-column 402a, is shown scanned from bottom-to-top, as indicated by arrows A'''. A second slice 406b, extending along second die-column 402b, is shown scanned from top-to-bottom, as indicated by arrows B'''. A third slice 406c, extending along third die-column 402c, is shown scanned from bottom-to-top, as indicated by arrows C'''. Slices 406 are analogous to one another. Also indicated are dies 412 (not all of which are numbered) and slice segments 416 (not all of which are numbered) along each of slices 406, respectively. Slice segments 416 are analogous to one another.

In FIG. 4, consecutive slices are scanned in opposite directions. The scanning in opposite directions may save time, since the scanning takes place both when the stage is translated "forward" and when the stage is translated "backward" (in parallel to the die-columns). Consecutively scanned slices are therefore scanned in opposite direction and image pre-processing to account for scanning in opposite directions is required (prior to the D2MD analysis). Scanning a single slice per die-column, in each implementation, may potentially be advantageous, particularly, when the available memory is limited. In this regard, it is noted that the required memory increases with the number of slices scanned per die-column in each implementation.

According to some alternative embodiments, not depicted in FIG. 4, in each implementation a single slice per die-column is scanned, with each of the slices being scanned in the same direction, so that between scanning of consecutive slices, the "cursor" of the imager is moved not only horizontally (along the x-axis) but also vertically (along the y-axis).

Scan data (e.g. a block image) of a tested slice segment may be analyzed for the presence of defects (in the tested slice segment) using, as reference (i.e. reference data), scan data of one or more reference slice segments analogous to the tested slice segment. Differences due to PV between the tested slice segment and the reference slice segments may be minimized by selecting reference slice segments that are "close" to the tested slice segment. That is, reference slice segments located on dies that are near the die on which the tested slice segment is located. The selection of the reference slice segments may also depend on the signature of the PV, as shown in FIG. 8B, for example, for a radial signature. In particular, it is to be understood that the selection of reference slice segments is not limited by proximity thereof to the tested slice segment, and, more generally, any slice segment, which is expected to exhibit small or minimum PV with respect to the tested slice segment, may be selected as reference.

FIG. 5A schematically depicts a non-limiting example of a selection of reference slice segments, according to some embodiments. Depicted are a tested die 512t (i.e. including a tested slice segment) and four reference dies (i.e. including reference slice segments), which are adjacent to tested die 512t. A first reference die 512a is located on the same die-column as tested die 512t and is adjacent thereto from above. A second reference die 512b is located on a die-column adjacent from the right to the die-column on which tested die 512t is located (i.e. second reference die 512b is adjacent to tested die 512t from the right). A third reference die 512c is located on the same die-column as tested die 512t and is adjacent thereto from below. A fourth reference die 512d is located on a die-column adjacent from the left to the die-column on which tested die 512t is located (i.e. fourth reference die 512d is adjacent to tested die 512t from the left).

A slice 506 extends along the die-column on which tested die 512t, first reference die 512a, and third reference die 512c are located. A slice 506' extends along the die-column on which fourth reference die 512d is located. A slice 506" extends along the die-column on which second reference die 512b is located.

Also indicated are slice segments 516 positioned along slice 506, 506', and 506", respectively. A tested slice segment 516t is positioned within tested die 512t along slice 506. A first reference slice segment 516a is positioned within first reference die 512a along slice 506. A second reference slice segment 516b is positioned within second reference die 512b along slice 506". A third reference slice segment 516c is positioned within third reference die 512c along slice 506. A fourth reference slice segment 516d is positioned within fourth reference die 512d along slice 506'.

FIGS. 5B, 5C, and 5D provide enlarged views of slice segments 516t, 516a, and 516b, respectively, according to some embodiments. Indicated in tested slice segment 516t is a group of pixels 520t including a central pixel 530t' and neighboring pixels 530t (as a non-limiting example, in FIG. 5B, the neighboring pixels include eight pixels, not all of which are numbered). Neighboring pixels 530t surround central pixel 530t'. Indicated in first reference slice segment 516a is a first reference group of pixels 520a including a central pixel 530a' and neighboring pixels 530a, which surround central pixel 530a'. Indicated in second reference slice segment 516b is a second reference group of pixels 520b including a central pixel 530b' and neighboring pixels 530b, which surround central pixel 530b'.

As used herein, a first pixel may be said to be "analogous" to a second pixel when—were it not for any fabrication imperfections and scanning imperfections—the first pixel and the second pixel would cover identical subareas within a first area (e.g. a slice segment) and a second area, respectively, which are fabricated to the same design. For example, central pixel 530t' is analogous to central pixel 530a', being identically positioned and covering identical subareas (of same topography)—up to fabrication imperfections and scanning imperfections—within tested die 512t and first reference die 512a, respectively, and more specifically, within slice segments 516t and 516a, respectively. Similarly, central pixel 530t' is analogous to central pixel 530b'.

A first group of pixels may be said to be "analogous" to a second group of pixels, when to any pixel in the first group there corresponds an analogous pixel in the second group and vice-versa. Group of pixels 520t is analogous to each of first reference group of pixels 520a and second reference group of pixels 520b. Further, a first image pixel, of a first pixel (i.e. a single-pixel "image" of an area on the wafer corresponding to the first pixel), may be said to be "analogous" to a second image pixel, of a second pixel, when the first pixel and the second pixel are analogous.

As used herein, according to some embodiments, scan data, said to "correspond" to a tested pixel (e.g. central pixel 530t'), may also include scan data of pixels near the tested pixel, such as one or more adjacent pixels, and/or one or more nearest-neighbor pixels (e.g. neighboring pixels 530t), and/or one or more second nearest-neighbor pixels, and so on.

According to some embodiments, in operation 120, per each of one or more tested pixels in a slice segment, a D2MD analysis is performed, wherein the reference pixels (whose scan data is used as reference) are each analogous to the tested pixel. According to some such embodiments, at least one of the reference pixels may be located on a different slice (and, hence, a different die-column) than the tested pixel. As a non-limiting example, the tested pixel may be central pixel 530t' and the reference pixels may include at least central pixel 530a' and central pixel 530b', which is located on a different slice than central pixel 530t'.

According to some embodiments, in operation 120, per each of one or more tested pixels in a slice segment, a D2MD analysis is performed, taking into account scan data of the tested pixel and one or more additional pixels on the same slice segment as the tested pixel, which may be located near thereto (e.g. scan data of tested pixel 530t' and scan data of one or more of neighboring pixels 530t). The reference data may then include scan data of a plurality of pixels analogous to the tested pixel, and one or more pluralities of pixels analogous to the one or more additional pixels, respectively. As a non-limiting example, the tested pixel may be central pixel 530t', the one or more additional pixels may be neighboring pixels 530t, the reference data may include at least scan data of first reference group pixels 520a (i.e. central pixel 530a' and neighboring pixels 530a) and second reference group of pixels 520b.

According to some embodiments, the reference data may further include (i) scan data from one or more other wafers manufactured to the same design and/or (ii) design data, such as CAD data.

Operation 120 may include initial sub-operations of registering the block images with respect to one another and/or generating difference images. According to some embodiments, the difference images, utilized in the D2MD analysis of scan data of a tested slice segment, may be taken by "subtracting" the block image of the tested slice segment from the block images of each of the reference slice segments.

More specifically, according to some embodiments, for each tested pixel a difference vector may be computed from scan data corresponding to the tested pixel (i.e. a set of measured values such as gray level values) and reference data (e.g. scan data of analogous pixels on neighboring dies and, optionally, design data). Each difference vector includes a set of difference values. According to some embodiments, a difference value may be obtained by taking the difference between a first gray level value, associated with a first image pixel, and a second gray level value, associated with a second image pixel (which is analogous to the first pixel). Thus, when the scan data corresponding to a tested pixel includes only the image pixel of the tested pixel, the difference vector includes difference values obtained from gray level values associated with the tested pixel and the reference pixels analogous thereto. When the scan data corresponding to a tested pixel includes the image pixel of the tested pixel and one or more other pixels near the tested pixel, the difference vector includes difference values obtained from gray level values associated with the tested pixel, the one or more other pixels, and reference pixels analogous to the tested pixel and the one or more other pixels.

According to some embodiments, as part of the determination of whether a tested pixel is defective, covariances between difference values, included in the difference vector (i.e. different components of the difference vector) and which correspond to the tested pixel, may be computed, as elaborated on below in the Systems subsection. According to some such embodiments, higher order moments, e.g. fourth-order moments, may additionally be computed.

According to some embodiments, artificial intelligence (AI) based tools, such as deep learning classifiers, may be employed, or additionally employed, to determine whether a tested pixel is defective.

FIGS. 6A-6E present example selections of reference dies, according to some embodiments. That is, dies that include slice segments which are to be utilized as reference in determining whether a tested slice segment is defective. According to some embodiments, and as depicted in FIG. 6A, all nearest neighbor dies to a tested die 601a are employed as reference. That is, all adjacent dies to tested die 601a (i.e. dies 611a, 613a, 615a, and 617a) and all diagonally nearest-neighbor dies to tested die 601a (i.e. dies 621a, 623a, 625a, and 627a) are employed as reference for detecting defects on tested die 601a or one or more areas thereof.

According to some embodiments, and as depicted in FIG. 6B, second nearest-neighbor dies to a tested die 601b may also be employed as reference for detecting defects on tested die 601b or one or more areas thereof. More specifically, as a non-limiting example, in FIG. 6B, only second nearest-neighbor dies that are closest to tested die 601b are employed as reference. That is, second nearest-neighbor dies that are located on the same die-column (dies 631b and 635b) or the same row (dies 633b and 637b) as tested die 601b. Also indicated are nearest-neighbor dies 611b, 613b, 615b, 617b, 621b, 623b, 625b, and 627b (which are also used as reference).

According to some embodiments, and as depicted in FIG. 6C, the selection of reference dies may be asymmetrical under interchange of the vertical and horizontal axes. More specifically, as a non-limiting example, in FIG. 6C, in addition to the four adjacent dies to a tested die 601c (i.e. dies 611c, 613c, 615c, and 617c), the two second nearest-neighbor dies, on the same die-column as tested die 601c (i.e. dies 631c and 635c), are additionally employed as reference for detecting defects on tested die 601c or one or more areas thereof. Thus, in FIG. 6C, a greater number of dies from the die-column, on which the tested die is located, are employed as reference, as compared to the row, on which the tested die is located.

According to some embodiments, and as depicted in FIG. 6D, the selection of reference dies may be asymmetrical under reflections about the vertical axis (i.e. the y-axis) and/or about the horizontal axis (i.e. the x-axis). More specifically, as a non-limiting example, in FIG. 6D, two dies, adjacent to a tested die 601d, are employed as reference for detecting defects on tested die 601d or one or more areas thereof. That is, a die 611d, which is adjacent to tested die 601d from above, and a die 613d, which is adjacent to tested die 601d from the right.

According to some embodiments, and as depicted in FIG. 6E, only dies located on the same row as a tested die 601e are employed as reference for detecting defects on tested die 601e or one or more areas thereof. More specifically, as a non-limiting example, in FIG. 6E, only dies adjacent to tested die 601e (and on the same row as tested die 601e), i.e. dies 613e and 617e, are employed as reference.

Generally, the number and choice of reference slice segments (and therefore the number of reference dies) may depend on various factors such as a target defect detection rate, a target throughput, the available memory space, the signature of the PV, the expected variation between analogous slice segments (e.g. on adjacent dies), the region on the wafer, the area within the tested die on which the tested slice segment is located, and the type or types of structures present on the tested slice segment. In particular, according to some embodiments, the number and choice of reference slice segments (i.e. the locations of the reference dies relative to the tested die) may vary from one tested slice segment to another.

Similarly, the number of pixels, surrounding a tested pixel, which are taken into account in checking whether the tested pixel is defective, may also depend on the above-listed factors.

FIGS. 7-8B schematically depict a realization of method 100, according to some specific embodiments thereof. The patterned wafers depicted in FIGS. 7-8B are assumed to exhibit a radial signature in the sense that PV is comparatively minimal between neighboring dies located at substantially the same distance from the center of the wafer.

Referring to FIG. 7, a first quadrant on a patterned wafer 700 is schematically depicted, according to some embodiments. Indicated are die-columns 702 and dies 712 (not all of which are numbered). PV on wafer 700 is characterized by a radial signature. Accordingly, PV between groups of neighboring dies, such as dies 712a, 712b, 712c, 712d, and 712e, which are located at substantially the same distance from a center P of wafer 700, is comparatively minimal. Each of dies 712b and 712d is a (diagonally) nearest neighbor to die 712c. Each of dies 712a and 712e is a (diagonally) second nearest neighbor to die 712c.

As non-limiting example, according to some embodiments, in operation 120, scan data corresponding to a tested pixel on a slice segment on die 712c may be analyzed taking into account (as reference data) scan data corresponding to an analogous pixel on die 712b and/or die 712d. According to some embodiments, in operation 120, scan data corresponding to analogous pixels on second nearest neighbors dies—at substantially the same distance as die 712c from the center P of wafer 700—may also be taken into account in determining whether the tested pixel is defective. (So that, in addition to scan data corresponding to analogous pixels on die 712b and/or die 712d, scan data corresponding to analogous pixels on die 712a and/or die 712e is also taken into account.)

Referring to FIG. 8A, a patterned wafer 800 is schematically depicted, according to some embodiments. Also indicated is an annular region 840, having a width $\Delta r$ (indicated in FIG. 8B) and centered about a center P' of wafer 800. Annular region 840 is delimited by a first circular boundary line $L_1$, having a (first) radius $r_1 = r - \Delta r/2$, and a second circular boundary line $L_2$, having a (second) radius $r_2 = r + \Delta r/2 = r_1 + \Delta r$.

According to some embodiments, slice segments located within a same annular region as a tested slice segment, and sufficiently closely thereto, may be used as reference in checking for the presence of defects within the tested slice segment. FIG. 8B presents an enlarged view of a region 850 on wafer 800, according to some embodiments. Indicated are dies 852 (not all of which are numbered), and analogous slice segments 856 (not all of which are numbered) within each of dies 852, respectively. Each of slice segments 856 is located between first boundary line $L_1$ and second boundary line $L_2$. A tested slice segment 856t (from slice segments 856) is located on a tested die 852t (from dies 852). The rest of dies 852 are nearest neighbors to tested die 852t, while the rest of slice segments 856 are each located within annular region 840.

As a non-limiting example intended to render the discussion more concrete, given a scan recipe which specifies that only slice segments, located on nearest neighbor dies (to a tested die), and within a "same" distance from the center of the wafer as the tested slice segment, are to be used as reference, then the full set of reference slice segments to tested slice segment 856t is constituted by the rest of slice segments 856.

According to some embodiments, in operation 110 each set of slices may be consecutively scanned in a multiplicity of perspectives. In such embodiments, in operation 120 the (multi-perspective) scan data may be subjected to an integrated analysis taking into account cross-perspective covariances. More specifically, according to some embodiments, each slice may simultaneously be scanned in two or more perspectives. Alternatively, according to some embodiments, each plurality of sets of slices may sequentially be scanned in two or more perspectives. According to some embodiments, in operation 120 scan data of a tested slice segment may first undergo D2MD analysis (in order to first suppress color variation resulting from PV), following which, the scan data may undergo a multi-perspective analysis, which takes into account the results of the D2MD analysis.

According to some embodiments, method 100 may further specify an optional operation 105, which may be performed initially, wherein scan parameters are selected (e.g. as part of the determination of the scan recipe). The scan parameters may specify a scan trajectory (i.e. a scan path). The scan trajectory may dictate, per each implementation, the slices to be scanned in each die-column—including, in particular, the number of slices in each set in the plurality of sets—and the direction of scanning of each slice. The scan trajectory may be selected so as to (i) optimize a goal function selected from a total scan duration, amount of memory consumed, throughput, or defect detection accuracy, or (ii) achieve a target trade-off there between (subject to the conditions specified in operation 110). According to some embodiments, the scan trajectory may be selected from a (pre-defined) list of scan trajectories. The list may specify at least two different scan trajectories: (i) a first scan trajectory wherein, in at least some of the implementations, two slices from each die-column are scanned in opposite directions (e.g. as depicted in FIGS. 2A-3), and (ii) a second scan trajectory wherein, in at least some of the implementations, a single slice in each die-column is scanned, with consecutively scanned slices being scanned in opposite directions (e.g. as depicted in FIG. 4).

As used herein, the term "scan trajectory" refers to the scan path on the wafer realized by one or more "cursors" of an imager implementing the scan. If the scan includes two or more implementations, the term "scan trajectory" is to be understood as specifying the scan paths of each of the implementations, respectively.

It is noted that in FIGS. 2A-5A, in each implementation, each slice is addressed only once—so that, for example, slice 206a2' is scanned after slice 206a1', which is scanned after slice 206a2, which in turn is scanned after slice 206a1. The scope of the disclosure, however, is not so limited and also covers embodiments wherein a slice may be addressed more than once during a single implementation, so that, for example, the scanning of a first slice interval on a first slice may be followed by the scanning of a slice interval on a second slice, which, in turn, may be followed later by the scanning of a second slice interval on the first slice. In particular, according to some embodiments, the first slice interval and the second slice interval—which both extend along the first slice—may be fully distinct and, moreover, disjoint, in the sense of there being at least one die there between. As a non-limiting example, FIG. 9 depicts such a scan trajectory, according to some embodiments wherein the PV on the wafer exhibits a radial signature.

Referring to FIG. 9, depicted is a scan trajectory T (not fully shown), which passes through dies 972 positioned at substantially the same distance d from a center C of a wafer 900, according to some embodiments. PV on wafer 900 is characterized by a radial signature. Only some of the dies on wafer 900 are shown. More specifically, only dies, positioned along four adjacent die columns 902a, 902b, 902c, and 902d, are shown. While along the leftmost of the die-columns through which the scan trajectory passes, die-column 902a (only three dies thereon are shown), the scan trajectory is continuous—extending vertically along dies 972a1, 972a2, and 972a3 (from dies 972)—along each of the rest of the die-columns, except a rightmost die-column (not shown) through which the scan trajectory passes, the scan trajectory is discontinuous and defines a pair of disjoint slice intervals. Thus, for example, along die-column 902b (only four dies thereon are shown), which is adjacent to die-column 902a, the scan trajectory is composed of a lower slice interval $I_1$ and an upper slice interval $I_2$, which are separated by three dies (not shown). The lower slice interval $I_1$ extends along dies 972b1 and 972b2 (from dies 972) and the upper slice interval $I_2$ extends along dies 972b3 and 972b4 (from dies 972). Or, for example, along die-column 902c (only two dies thereon are shown), which is adjacent to die-column 902b, the scan trajectory is composed of a lower slice interval $I_3$ and an upper slice interval $I_4$, which are separated by seven dies (not shown). The lower slice interval 13 extends along a single die 972c1 (from dies 972) and the upper slice interval $I_4$ extends along a single die 972c2 (from dies 972).

FIG. 10 presents a flowchart of a computer-based method 1000 for wafer analysis, according to some embodiments. Method 1000 may include:

- An operation 1010 of selecting (i) the type of analysis that scan data—to be collected from a patterned wafer—is to be subjected to in order to determine presence of defects on the wafer, and (ii) scan parameters specifying at least a scan trajectory according to which the wafer is to be scanned.
- An operation 1020 of scanning the wafer according to the selected scan trajectory.
- An operation 1030 of analyzing the collected scan data, according to the selected analysis type, to determine presence of defects on the wafer.

According to some embodiments, in operation 1010, the analysis type may be selected from die-to-die (D2D) analysis and D2MD analysis (including the number of dies to be employed in the D2MD analysis and relative locations thereof) may be selected. In particular, the greater the PV between nearest neighbor dies, the greater the number of reference dies that may be selected. In this regard, it is noted that, typically, the greater the size of the dies, the greater the PV there between. Consequently, when the dies are small, fewer reference dies may be required, or even a D2D analysis (instead of a D2MD analysis) may be sufficient to achieve a target defect detection accuracy.

The scan trajectory dictates the order at which slices in each die-column are to be scanned. When the selected analysis type is D2D, the selected scan trajectory may specify fully scanning a die-column before proceeding to a next die-column. When the selected analysis type is D2MD, the selected scan trajectory may specify the number of implementations, and per each of the implementations, the number of slices in each of the sets in the plurality of sets of slices (i.e. the number of slices scanned per die-column in each implementation).

According to some embodiments, the scan trajectory may be selected taking into account whether the analysis of the scan data is to be performed online (i.e. in real-time or near real-time) or offline (i.e. after completing the scan of the wafer).

According to some embodiments, the scan trajectory may be selected from a predefined set of scan trajectories such that (i) a goal function, selected from a total scan duration, throughput, maximum amount of memory in use during the scan, and defect detection accuracy, is optimized, or (ii) a target trade-off there between is achieved.

According to some embodiments, the predefined set of scan trajectories includes at least a first scan trajectory and a second scan trajectory. The first scan trajectory specifies, in at least some of the implementations, scanning two slices from each die-column in alternating directions (e.g. essentially as depicted in FIG. 3). The second scan trajectory specifies, in at least some of the implementations, scanning a single slice in each die-column with consecutively scanned slices being scanned in alternating directions (e.g. essentially as depicted in FIG. 4).

According to some embodiments, the predefined set of scan trajectories further includes a raster scan trajectory, wherein the wafer or a region thereof is fully scanned in a single implementation.

Figure 11:
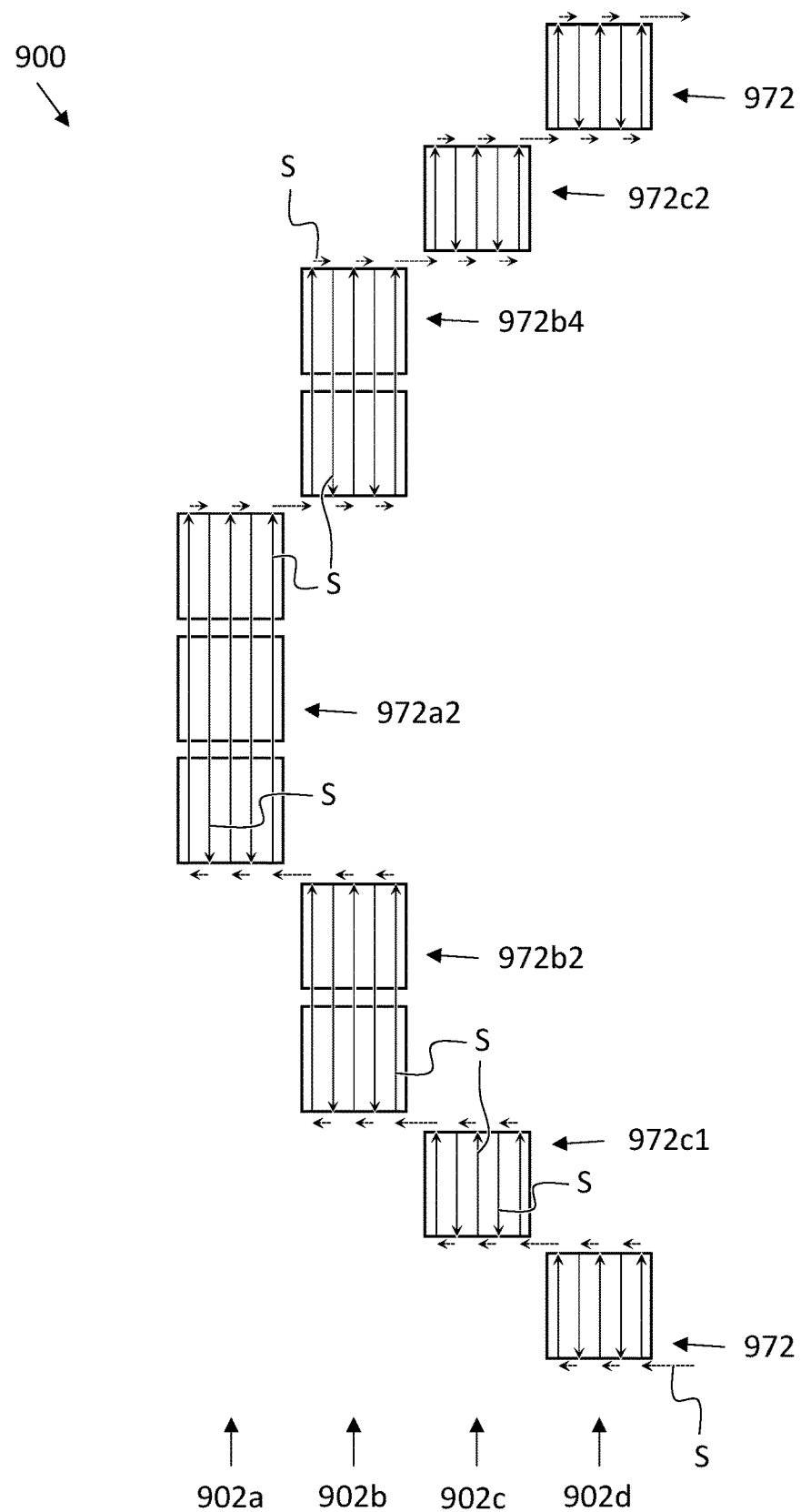
FIG. 11 presents a scan trajectory on a tested wafer exhibiting radial process variation, according to some specific embodiments of the method of FIG. 10.

According to some embodiments, the predefined set of scan trajectories further includes a scan trajectory such that in each implementation a respective plurality of dies, arranged in a respective ring-like arrangement about a center of the wafer, is fully scanned (essentially as depicted in FIG. 11 and as described below in the description thereof).

As a non-limiting example, Table 1 specifies example selections of scanning trajectories based on the amount of random access memory (RAM) available, or allocated, and the maximum time $t_{max}$ allocated for completing the scanning of wafer, assuming a D2MD analysis of the scan data is to be performed, according to some embodiments.

As specified in the second row of Table 1, when the amount of RAM available is limited to scan data of two slices, and/or when it is sought to minimize memory usage, and the scan time allocated to fully scan the wafer is not constrained, each set of slices may include only a single slice. In each implementation, one slice per die-column is scanned, and—in addition to scan data of the presently scanned slice—scan data of the last scanned slice (before the presently scanned slice) are stored in the RAM. Consecutively scanned slices may be scanned in alternating directions, essentially as depicted in FIG. 4.

TABLE 1 selection of scan trajectory

| RAM available or allocated | Scan time allocated | Example of selected scan trajectory | Maximum number of analogous slices, per tested slice, to be used as reference |
|---|---|---|---|
| for scan data of two slices | not constrained | single slice per die-column, alternating directions | one slice |
| for scan data of ten slices | not constrained | two slices per die-column, analogous slices scanned in same direction | (up to) four slices |
| not constrained | not constrained | two slices per die-column, analogous slices scanned in same direction | (up to) number of die-columns |
| for scan data of two slices | to be minimized | single slice per die-column, alternating directions | one slice |
| for scan data of nine slices | to be minimized | eight slices per die-column, analogous slices scanned in same direction | one slice |
| not constrained | to be minimized | raster scan | (up to) number of die-columns |

As specified in the third row of Table 1, when the amount of memory available is limited to scan data of ten slices, and the scan time allocated to fully scan the wafer is not constrained, each set of slices may include only two slices (so that the time interval between scanning of analogous slices is minimized and color variation is reduced). In each implementation, two slices per die-column are scanned in opposite directions, such that analogous slices are scanned in the same direction, essentially as depicted in FIG. 3, and scan data of eight slices from the four last scanned die-columns (before the presently scanned die-column) are stored in the RAM.

As specified in the fourth row of Table 1, when the amount of memory available is not constrained, and the scan time allocated to fully scan the wafer is also not constrained, each set of slices may include two slices. In each implementation, two slices per die-column are scanned in alternating directions, such that analogous slices are scanned in the same direction, essentially as depicted in FIG. 3, and scan data of the $2q$ last scanned slices (before the presently scanned pair of slices) is stored in the RAM. Even though the amount memory available is sufficiently large to allow each set of slices to include more than two slices, and, and even to carry out a raster scan, scanning two slices per die-column has the twin advantages that analogous slices are scanned in the same direction and that the time interval between scanning of analogous slices on adjacent die-columns is kept short.

As specified in the fifth row of Table 1, when the amount of RAM available is limited to scan data of two slices, and the scan time allocated to fully scan the wafer is to be minimized, each set of slices may include only a single slice. In each implementation, one slice per die-column is scanned, and scan data of the last scanned slice (before the presently scanned slice) is stored in the RAM. Consecutively scanned slices may be scanned in alternating directions, essentially as depicted in FIG. 4.

As specified in the sixth row of Table 1, when the amount of RAM available is limited to scan data of nine slices, and the scan time allocated to fully scan the wafer is to be minimized, each set of slices may include nine slices. In each implementation, eight slices per die-column are scanned in alternating direction, with analogous slices being scanned in the same direction, essentially as depicted in FIG. 3. Scan data of the eight last scanned slices—in addition to scan data of the presently scanned slice—are stored in the RAM. More specifically, when the l-th slice (l≤9) on a currently scanned die-column has finished being scanned, and the scan data thereof have finished undergoing the D2MD analysis (i.e. scan data of the l-th slice on the last scanned die-column are not to be further analyzed and are not to be further used as reference), the scan data of the l-th slice on the last scanned die-column (before the currently scanned die-column) are deleted.

As specified in the seventh row of Table 1, when the amount of memory available is not constrained, and the scan time allocated to fully scan the wafer is to be minimized, the scan trajectory may correspond to a raster scan, wherein the wafer is scanned in a single implementation with each die-column being continuously fully scanned before proceeding to a next die-column.

According to some embodiments, the analysis may be multi-perspective, as described above in the description of method 100.

According to some embodiments of method 1000, in operation 1010 a scan trajectory may be selected, which specifies in each implementation fully scanning respective subgroups of dies in one or more of the die-columns. That is, in each implementation, along each die-column a raster scan may be implemented on a respective subgroup of dies on the die-column. On each die-column, the subgroups scanned in each implementation, may be distinct.

To render the discussion more concrete, and thereby facilitate the description, reference is now made to FIG. 11. FIG. 11 depicts an alternative scan trajectory S to the scan trajectory depicted in FIG. 9, according to some embodiments, wherein, in each implementation, scanned dies are scanned in full, as indicated by the alternating arrows within each of the depicted dies, which extend along each of the N slice intervals thereon. (As a non-limiting example, in FIG. 11, N=5, i.e. each die-column includes only five slices.) More specifically, the same dies as in FIG. 9 are depicted in FIG. 11 (only some of dies 972 are numbered in FIG. 11). Accordingly, in each implementation a respective "ring" of dies (i.e. dies defining a ring-like arrangement centered about the center of wafer 900) may be fully scanned until the wafer is fully scanned.

According to some alternative embodiments, there is provided a method for wafer inspection, which includes:

An operation of selecting a scan trajectory (including the type of analysis, e.g. D2D or D2MD, and number of implementations), according to which the wafer is to be scanned, based on a timescale $t_{eff}$ of a temporal effect(s) and imperfections impacting the wafer and/or the scanning equipment, and, optionally, one or more of a target false alarm rate, available RAM, and an expected (forecast) PV. The scan trajectory may be selected under the constrains that in each implementation:

(When the scan is implemented on-line) at no point during the scan does the required RAM, consumed by the D2MD (or D2D) analysis, exceed the available RAM.

Per each tested slice segment scanned, the tested slice segment and the respective reference slice segments (the number and relative locations thereof may be determined, or partially determined, in the previous operation) are scanned (in the same implementation) within a time interval smaller than, or about equal to, $t_{eff}$.

Optionally, the expected PVs (e.g. as estimated based on prior knowledge of the manufacturing process used to fabricate the wafer, and/or differences between gray level values of pixels in block images corresponding to the tested slice segment and the reference slice segments, etc.) between each tested slice segment and each of its respective reference slice segments are smaller than a threshold value.

An operation of scanning the wafer according to the selected scan trajectory.

An operation of analyzing the collected scan data, according to the selected analysis type (e.g. D2MD), to determine presence of defects on the wafer.

It is to be understood that the above method generalizes method 100 in the sense that in the operation of selecting the scan trajectory any of the scan trajectories of method 100 may be selected (and then realized in the operation of scanning the wafer).

According to some embodiments, the operation of scanning of analyzing the collected scan data may be performed simultaneously to the operation of scanning the wafer.

Systems

Figure 12:
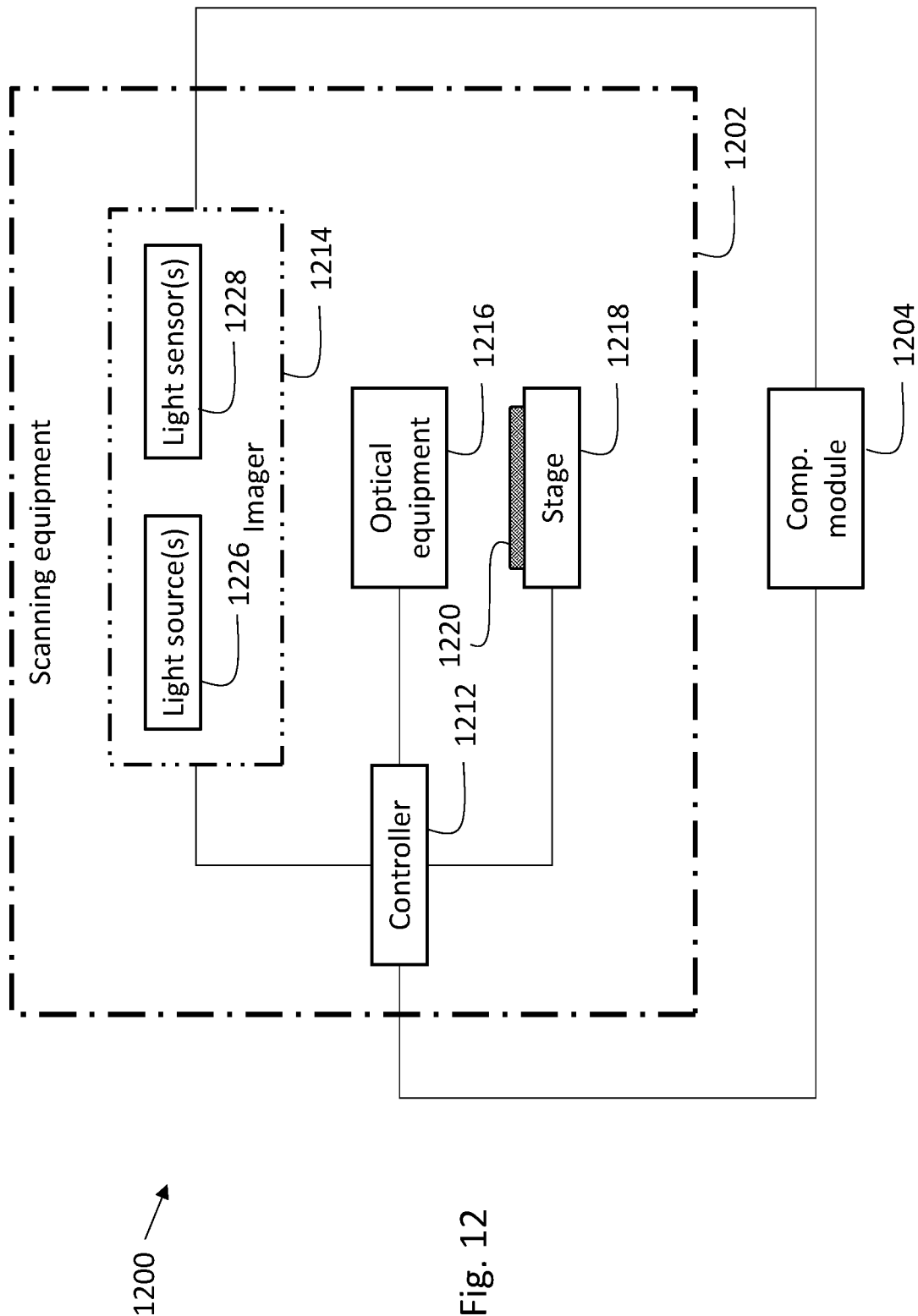
FIG. 12 presents a block diagram of system for die-to-multi-die wafer analysis, according to some embodiments.

According to an aspect of some embodiments, there is provided a computerized system for obtaining scan data of a patterned wafer and performing die-to-multi-die (D2MD) analysis of the scan data. FIG. 12 presents a block diagram of such a system, a computerized system 1200, according to some embodiments. System 1200 includes scanning equipment 1202 and a computational module 1204. Scanning equipment 1202 is configured to scan a wafer (or an optical mask). Computational module 1204 is configured to receive scan data obtained by scanning equipment 1202, and to analyze the scan data, as described above in the Methods subsection and as elaborated on below. In particular, system 1200 may be configured to implement the method of FIG. 1.

According to some embodiments, scanning equipment 1202 includes a controller 1212, an imager 1214 (imaging device), and optical equipment 1216. According to some embodiments, scanning equipment may further include a stage 1218 configured to accommodate a wafer, such as a patterned wafer 1220. In particular, wafer 1220 may include dies characterized by non-repetitive patterns (within a die), such as random logic areas. Scanning equipment 1202 is delineated by a dashed-dotted box to indicate that components therein (e.g. imager 1214 and stage 1218) may be separate from one another, e.g. in the sense of not being included in a common housing.

Imager 1214 may include one or more light sources 1226 (e.g. visible, ultraviolet, and/or near infrared light sources) configured to irradiate a wafer 1220. Imager 1214 may further include one or more light sensors 1228 configured to convert light returned from wafer 1220 into an electrical current or voltage signal. More specifically, imager 1214 may be configured to implement light collection techniques, including brightfield collection, grayfield collection, and/or the like. Imager 1214 is delineated by a dashed-double-dotted box to indicate that components therein (e.g. light source(s) 1226 and light sensor(s) 1228) may be separate from one another.

Optical equipment 1216 may include optical filters (e.g. spatial filters, polarizing filters, Fourier filters), beam splitters (e.g. polarizing beam splitters), mirrors, lenses, prisms, grids, deflectors, reflectors, apertures, and/or the like, as known in the art of wafer inspection. According to some embodiments, optical equipment 1216 may include any arrangement of optical components configured to set or modulate one or more optical properties (such as shape, spread, polarization) of a light beam(s) from light source(s) 1226, which is incident on wafer 1220. According to some embodiments, optical equipment 1216 may further include any arrangement of optical components configured to select (e.g. by filtering) one or more optical properties of a returned light beam(s) (e.g. a beam(s) specularly reflected by, or diffusely scattered off of, wafer 1220) prior to the detection thereof. According to some embodiments, optical equipment 1216 may further include optical components configured to direct the returned light beam(s) towards light sensor(s) 1228.

Controller 1212 may be functionally associated with imager 1214 and optical equipment 1216, as well as with computational module 1204. Controller 1212 may further be functionally associated with stage 1218. More specifically, controller 1212 is configured to control and synchronize operations and functions of the above-listed modules and components during scanning of a wafer. For example, according to some embodiments, wherein stage 1218 is movable, stage 1218 may be configured to mechanically translate an inspected wafer, placed thereon, along a trajectory set by controller 1212, which also controls imager 1214.

Scanning equipment 1202 may be configured to realize any one of the scan trajectories of FIGS. 2A-2C, FIG. 3, FIG. 4, and FIG. 9, respectively. More generally, scanning equipment 1202 may be configured to realize any scan trajectory wherein distinct pluralities of sets of slices on a (patterned) wafer are scanned one plurality after the other, as described in the description of method 100.

Computational module 1204 includes computer hardware (one or more processors, such as image and/or graphics processor units, and RAM, as well as non-volatile memory components; not shown). The computer hardware is configured to analyze scan data, received from imager 1214, of a plurality of pixels on a wafer, such as wafer 1220, for presence of defects. In particular, computational module 1204 may be configured to perform D2MD analysis of scan data from a tested slice segment on a tested die, and two or more reference segments, analogous to the tested segment, on two or more reference dies (which may be located on different die-columns), respectively, as described above in the Methods subsection.

According to some embodiments, computational module 1204 may be configured to analyze scan data in real-time or near real time, that is, as the scan data is being collected by scanning equipment 1202. According to some such embodiments, computational module 1204 may be configured to—once scan data, pertaining to a tested slice segment, have been analyzed for the presence of defects in the tested slice segment, and are not to be further utilized (e.g. as reference data)—save the results of the analysis and delete the scan data. Alternatively (even when the scan data is analyzed online for presence of defects), the scan data may be stored for future use, e.g. for debugging purposes.

Computational module 1204 may further include an analog-to-digital (signal) converter (ADC) and a frame grabber (not shown). The ADC may be configured to receive analog image signals from imager 1214. The ADC may further be configured to convert the analog image signals into digital image signals and to transmit the digital image signals to the frame grabber. The frame grabber may be configured to obtain from the digital image signals, digital images (block images, also referable to as "image frames") of slice segments (e.g. in FIG. 3, slice segments 316 and 318; in FIG. 4, slice segments 416; or, in FIG. 5A, slice segments 516) on a scanned wafer. The frame grabber may be further configured to transmit the digital images to one or more of the processors and/or memory components (not shown; included in computational module 1204). In particular, according to some embodiments, the frame grabber may be configured to transmit the digital images to an image pre-processing module. The image pre-processing module may be configured to suppress noise in a block image, adjust brightness of different parts of a block image, crop a block image, correct or account for overlap between block images, correct or account for opposite directions of scanning (e.g. in FIG. 4, between a slice segment on first slice 406*a* and an analogous slice segment on second slice 406*b*) and so on. The pre-processed block images may then be analyzed for the presence of defects, as described below.

According to some embodiments, computational module 1204 is configured to, per each tested pixel (e.g. central pixel 530*t'* in FIG. 5B), compute a difference vector, based at least on the scan data, corresponding to the tested pixel, and reference pixels analogous thereto.

More specifically, according to some such embodiments, wherein the noise is known or observed to be sufficiently close to Gaussian, computational module 1204 may be configured to, per each tested pixel:
Compute a difference vector corresponding to the tested pixel.
Compute a covariance matrix corresponding to the tested pixel based on covariances between components of the difference vector, and multiply the difference vector by the inverse of the covariance matrix to obtain a second vector.
Take scalar product of the second vector and a third vector (e.g. a predetermined kernel), which represents—up to an overall scale factor—the expected signal that would be obtained if the tested pixel were defective (in the absence of noise).
If the scalar product exceeds a pre-determined threshold, label the tested pixel as defective.

According to some embodiments, as part of the determination of whether a tested pixel is defective, computational module 1204 may be configured to compute higher order moments (e.g. fourth order moments) between components of the difference vector that corresponds to the tested pixel.

According to some embodiments, computational module 1204 may be configured to employ, or additionally employ, AI-based algorithms, such as deep learning classifiers, to determine whether a tested pixel is defective.

According to some embodiments, computational module 1204, or another computational module communicatively associated with controller 1212, may be configured to select the scan trajectory that is to be employed in scanning a wafer. The scan trajectory may be selected so as to (i) optimize a goal function selected from a total scan duration, amount of memory consumed, throughput, or defect detection accuracy, or (ii) achieve a target trade-off there between. According to some embodiments, the scan trajectory may be selected from a (pre-defined) list of scan trajectories. The list may specify at least two different scan trajectories: A first scan trajectory specifies, in at least some of the implementations, scanning two slices from each die-column in opposite directions (e.g. as depicted in FIGS. 2A-3). A second scan trajectory specifies, in at least some of the implementations, scanning a single slice in each die-column, with consecutively scanned slices being scanned in opposite directions (e.g. as depicted in FIG. 4).

According to some embodiments, scanning equipment 1202 may be configured to scan the wafer in a multiplicity of perspectives, with each set of slices, from a respective plurality of sets of slices, being consecutively scanned in each of the multiplicity of perspectives before proceeding to scanning a next set of slices in the respective plurality of sets of slices. According to some embodiments, the multiplicity of perspectives may include two or more of an illumination angle(s), an intensity of the illuminating radiation, an illumination polarization, an illumination wavefront, an illumination spectrum, one or more focus offsets of the illuminating light beam, a collection angle(s), an intensity of the collected radiation, a collection polarization, a phase of the collected beam(s), brightfield channel, grayfield channel, Fourier filtering of returned light, and a sensing type selected from intensity, phase, or polarization, and compatible combinations thereof.

According to some embodiments, system 1200 may additionally be configured to implement method 1000. More specifically, in such embodiments, computational module 1204 may be configured to implement operation 1010 of method 1000. In such embodiments, scanning equipment 1202 may be further be configured to implement "standard" scanning, wherein die-columns are fully scanned one after the other (as well as being configured to implement the scan trajectories disclosed in the description of method 100, e.g. (i) scanning two slices from each die-column in opposite directions before proceeding to a next die-column until the wafer is fully scanned, (ii) scanning a single slice in each die-column before proceeding to a next die-column, with consecutively scanned slices being scanned in opposite directions, until the wafer is fully scanned). According to some embodiments, scanning equipment 1202 may further be configured to realize scan trajectories wherein, in each implementation, subgroups of dies on one or more die-columns are fully scanned (such as in the scan trajectory depicted in FIG. 11). According to some embodiments, scanning equipment 1202 may further be configured to implement raster scanning of a wafer wherein the wafer or a target region thereof is fully scanned in a single implementation.

Additionally, or alternatively, according to some embodiments, system 1200 may further be configured to implement the last described method in the Methods subsection.

FIGS. 13A-13C schematically depict memory allocations in a RAM of system 1200, in three applications, respectively, of method 100 (or more generally method 1000), according to some embodiments. In each of the applications, the analysis of scan data is performed online. In each of the applications depicted in FIGS. 13A and 13B, the capacity of the RAM allows storing scan data of six slices. In the application depicted in FIG. 13C, the capacity of the RAM allows storing scan data of ten slices.

FIG. 13A depicts memory allocation during scanning along a scan trajectory wherein a pair of slices per each die-column (DC) is scanned in each implementation (with consecutive slices scanned in alternating directions, as depicted, for instance, in FIGS. 2A-2C and in FIG. 3), according to some embodiments. More specifically, FIG. 13A depicts memory allocation in an m-th implementation, wherein the (2m−1)-th and 2m-th slices in each of the die-columns are scanned. The RAM is at full capacity storing scan data of slices 2m−1 and 2m in each of the (n−1)-th, n-th, and (n+1)-th die-columns, respectively. Thus, for example, D2MD analysis of scan data of a tested die on the n-th die column may be implemented taking into account scan data of dies (e.g. adjacent or nearest-neighbor dies) on each of the (n−1)-th and (n+1)-th die-columns (as well as scan data of other (reference dies) on the n-th die-column).

FIG. 13B depicts memory allocation during scanning along a scan trajectory wherein a single slice per each die-column is scanned in each implementation (with consecutive slices scanned in alternating directions, as depicted in FIG. 4), according to some embodiments. More specifically, FIG. 13B depicts memory allocation in an m-th implementation, wherein the m-th slices in each of the die-columns are scanned. The RAM is at approximately 83% capacity storing scan data of slice m in each of the (n−2)-th, (n−1)-th, n-th, (n+1)-th, and (n+2)-th die-columns, respectively. Thus, for example, D2MD analysis of scan data of a tested die on the n-th die column may be implemented additionally taking into account scan data of dies (e.g. next-nearest neighbor dies, that is, nearest neighbor to the nearest neighbor) on each of the (n−2)-th and (n+2)-th die-columns, (as well as scan data of other (reference) dies on the n-th die-column and on the (n−1)-th and (n+1)-th die-columns).

FIG. 13C depicts memory allocation for a scan trajectory according to some embodiments wherein a pair of slices per each of the die-columns (DCs) is scanned in each implementation (with consecutive slices scanned in alternating directions). As Compared to FIG. 13A, in FIG. 13C scan data of last scanned ten slices, instead of last scanned six slices, is kept stored in the RAM. More specifically, FIG. 13C depicts memory allocation in an m-th implementation, wherein the (2m−1)-th and 2m-th slices in each of the die-columns are scanned. The RAM is at full capacity storing scan data of slices 2m−1 and 2m in each of the (n−2)-th, (n−1)-th, n-th, (n+1)-th, and (n+2)-th die-columns, respectively. Thus, for example, D2MD analysis of scan data of a tested die on the n-th die column may be implemented taking into account scan data of dies (e.g. adjacent, nearest-neighbor, and next-nearest neighbor dies) on each of the (n−1)-th and (n+1)-th die-columns and next-nearest neighbor dies on each of the (n−2)-th and (n+2)-th die-columns (as well as scan data of other (reference dies) on the n-th die-column).

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A computer-based method for obtaining and analyzing multi-die scan data of a patterned wafer, the method comprising sequentially implementing:
  an operation of scanning a respective plurality of sets of slices on a wafer, wherein each set comprises a selection of slices from a respective die-column on the wafer, wherein each slice in each set is analogous to a single slice, respectively, in each of the other sets; and
  for tested slice segments in a multiplicity of slice segments in the plurality of sets, an operation of performing die-to-multi-die (D2MD) analysis of scan data of the tested slice segment to detect defects therein, taking into account as reference, scan data of two or more reference slice segments in the multiplicity of slice segments, which are analogous to the tested slice segment and located on two or more of the die-columns, respectively.

2. The method of claim 1, wherein each slice in each set is partially scanned, and wherein at least some of the partially scanned slices comprise disjoint slice intervals.

3. The method of claim 1, wherein, each implementation further comprises an operation, following the operation of performing the D2MD analysis, in which analysis results are saved and the scan data, obtained in the operation of scanning the respective plurality of sets, is discarded.

4. The method of claim 1, wherein the D2MD analysis of the scan data of a tested slice segment from the multiplicity of slice segments comprises generating difference images between block images of the tested slice segment and each of the respective reference slice segments.

5. The method of claim 1, wherein analogous slices are scanned in a same direction and/or wherein consecutively scanned slices in each set are scanned in alternating directions.

6. The method of claim 1, wherein each set, in the respective plurality of sets, comprises two or more adjacent slices.

7. The method of claim 1, wherein per of the tested slice segments in the multiplicity of slice segments, a die-column, on which the tested slice segment is located, is included in the respective two or more die-columns on which the respective two or more reference slice segments are located; and/or
wherein per the slice segments in the multiplicity of slice segments, a die-column, adjacent to the die-column on which the tested slice segment is located, is included in the respective two or more die-columns on which the two or more reference slice segments are located.

8. The method of claim 7, wherein per the tested slice segments in the multiplicity of slice segments, the respective two or more reference slice segments comprise four slice segments that are located on four dies, respectively, wherein each of the four dies is adjacent to a die on which the tested slice segment is located.

9. The method of claim 1, wherein process variation on the wafer exhibits a radial signature, and, wherein per one tested slice segment in the multiplicity of slice segments, the respective two or more reference slice segments comprise one or more slice segments positioned at substantially the same distance, from a center of the wafer, as the tested slice segment.

10. The method of claim 1, wherein a number of slices in each of the plurality of sets is selected such that a total scan duration, throughput, maximum amount of memory in use during the scan, and defect detection accuracy, is optimized, and/or or a target trade-off there between is achieved.

11. The method of claim 1, wherein each of the tested slice segments, and the two or more reference slice segments analogous thereto, are scanned within a time interval such that an expected process variation there between is smaller than a predefined threshold.

12. The method of claim 1, wherein the scanning is optical.

13. A computer-based method for obtaining and analyzing scan data of a patterned wafer, the method comprising:
an initial operation, wherein a scan trajectory is selected from a predefined set of scan trajectories such that:
a goal function, selected from a total scan duration, throughput, maximum amount of memory in use during the scan, and defect detection accuracy, is optimized; or
a target trade-off there between is achieved;
an operation of scanning the wafer according to the selected scan trajectory; and
an operation of analyzing scan data, collected in the scan, to determine presence of defects on the wafer;
wherein the predefined set of scan trajectories comprises at least a first multi-implementation scan trajectory and a second multi-implementation scan trajectory, wherein the first scan trajectory specifies scanning two slices from each die-column in alternating directions, and wherein the second scan trajectory specifies scanning a single slice in each die-column with consecutively scanned slices being scanned in alternating directions.

14. The method of claim 13, wherein the predefined set of scan trajectories further comprises a raster scan trajectory wherein the wafer or a target region thereof is fully scanned in a single implementation.

15. The method of claim 13, wherein the predefined set of scan trajectories further comprises a scan trajectory such that a respective plurality of dies, arranged in respective a ring-like arrangement about a center of the wafer, is fully scanned.

16. A computerized system for obtaining and analyzing multi-die scan data of a patterned wafer, the system comprising:
scanning equipment; and
a computational module,
wherein the scanning equipment is configured to sequentially scan sets of slices in a controllably selectable plurality of sets of slices on a patterned wafer, and
wherein each set comprises a selection of slices from a respective die-column on the wafer, and
wherein each slice in each set is analogous to a single slice, respectively, in each of the other set, and
wherein the computational module is configured to, for tested slice segments in a multiplicity of slice segments included in the plurality of sets, perform die-to-multi-die (D2MD) analysis of scan data of the tested slice segment to detect defects therein, taking into account as reference, scan data of two or more reference slice segments in the multiplicity of slice segments, which are analogous to the tested slice segment and located on two or more of the die-columns, respectively.

17. The system of claim 16, further configured to successively scan, and perform D2MD analysis with respect to, two or more pluralities of sets slices, wherein the computational module is configured to, following the D2MD analysis of scan data of a plurality of sets from the two or more pluralities of sets, save results, obtained in the D2MD analysis, and discard the scan data.

18. The system of claim 16, further configured to successively scan, and perform D2MD analysis with respect to, two or more pluralities of sets slices, wherein the scanning equipment is further configured to scan in alternating directions consecutively scanned slices in each set of slices, and wherein each set in at least one of the two pluralities of sets, comprises two or more adjacent slices.

19. The system of claim 16, wherein, per the tested slice segments in the multiplicity of slice segments, a die-column, on which the tested slice segment is located, is included in the respective two or more die-columns on which the respective two or more reference slice segments are respectively located; and/or
wherein, per the tested slice segments in the multiplicity of slice segments, a die-column, adjacent to the die-column on which the tested slice segment is located, is included in the two or more die-columns on which the respective two or more reference slice segments are respectively located.

20. The system of claim 16, wherein the scanning equipment comprises an optical-based imager.

* * * * *